United States Patent [19]
Diebold et al.

[11] Patent Number: 5,504,259
[45] Date of Patent: Apr. 2, 1996

[54] PROCESS TO CONVERT BIOMASS AND REFUSE DERIVED FUEL TO ETHERS AND/OR ALCOHOLS

[75] Inventors: James P. Diebold, Lakewood; John W. Scahill, Evergreen; Helena L. Chum, Arvada; Robert J. Evans, Lakewood; Bahman Rejai, Lakewood; Richard L. Bain, Golden; Ralph P. Overend, Lakewood, all of Colo.

[73] Assignee: Midwest Research Institute, Kansas City, Mo.

[21] Appl. No.: 968,588

[22] Filed: Oct. 29, 1992

[51] Int. Cl.$^6$ ............... C07C 41/05; C07C 29/04; C07C 1/00
[52] U.S. Cl. ............... 568/697; 568/897; 585/240; 585/242; 585/310
[58] Field of Search ............... 585/240, 241, 585/242, 310, 312, 313, 314, 467, 648, 649, 653, 651, 510, 514, 520, 671; 568/697, 897, 898

[56] References Cited

U.S. PATENT DOCUMENTS

| | | | |
|---|---|---|---|
| 3,901,951 | 8/1975 | Nishizaki | 585/241 |
| 4,300,009 | 10/1981 | Haag et al. | 585/408 |
| 4,308,411 | 12/1981 | Frankiewicz | 585/240 |
| 4,851,601 | 7/1989 | Fukuda et al. | 585/241 |
| 4,969,987 | 11/1990 | Le et al. | 208/67 |
| 5,100,534 | 3/1992 | Le et al. | 208/70 |

OTHER PUBLICATIONS

I. S. Goldstein, *Organic Chemicals from Biomass*, 64, ed. Boca Raton, Florida.: CRC Press, 1981.
N. Y. Chen et al., *Shape Selective Catalysis in Industrial Applications*, New York: Marcel Dekker, 1989.
"MBMS Studies of HZSM–5 Activity During Wood Pyrolysis Product Conversion" in *Research in Thermochemical Biomass Conversion*, 910–926, ed. A. V. Bridgewater and J. L. Kuester, N.Y.: Elsevier Applied Sci. Publ. 1988.
*Fundamentals of Classical Thermodynamics*, New York: John Wiley & Sons 1965.
"Low–Pressure Upgrading of Vacuum–Pyrolysis Oils from Wood" in *Pyrolysis Oils from Biomass*, ACS Symposium Series 376, 290–310, ACS, 1988. Renaud et al.
"Chemical and Physical Properties of the ZSM–5 Substitutional Series" J. Catal. 61, 390–396 (1980).
"The Active Site of Acidic Aluminosilicate Catalysts" Nature 309, 589–591 (1984).
N. Y. Chen et al., "Fluidized–Bed Upgrading of Wood Pyrolysis Liquids and Related Compounds" Amer. Chem. Soc. (1988) 277–289.
W. O. Haag et al., "Catalytic Production of Aromatics & Olefins from Plant Materials" in Prepr. Div. Pet. Chem., Am. Chem. Soc. 25, 650–656 (1980).
J. P. Diebold et al., "Biomass–to–Gasoline (BTG): Upgrading Pyrolysis Vapors to Aromatic Gasoline with Zeolite Catalysts at Atmospheric Pressure" in *Pyrolysis Oils from Biomass*, ACS.
M. N. Soltys et al., "The SERI High Pressure, Molecular––Beam Mass Spectrometric Sampling System" in SERI/TR–622–1172 (1982).

*Primary Examiner*—Asok Pal
*Assistant Examiner*—P. Achutamurthy
*Attorney, Agent, or Firm*—Edna M. O'Connor

[57] ABSTRACT

A process for conversion of a feedstock selected from the group consisting of biomass and refuse derived fuel (RDF) to provide reformulated gasoline components comprising a substantial amount of materials selected from the group consisting of ethers, alcohols, or mixtures thereof, comprising: drying said feedstock; subjecting said dried feedstock to fast pyrolysis using a vortex reactor or other means; catalytically cracking vapors resulting from said pyrolysis using a zeolite catalyst; condensing any aromatic byproduct fraction; catalytically alkylating any benzene present in said vapors after condensation; catalytically oligomerizing any remaining ethylene and propylene to higher olefins; isomerizing said olefins to reactive iso-olefins; and catalytically reacting said iso-olefins with an alcohol to form ethers or with water to form alcohols.

29 Claims, 20 Drawing Sheets

PROCESS TO CONVERT BIOMASS AND REFUSE DERIVED FUEL TO ETHERS AND/OR ALCOHOLS

The United States Government has rights in this invention under Contract No. DE-AC02-83CH10093 between the United States Department of Energy and the National Renewable Energy Laboratory, a Division of the Midwest Research Institute.

BACKGROUND OF THE INVENTION

1. Field of the Invention

The present invention relates to a multi-step process for converting refuse-derived fuel (RDF) or biomass into ethers and/or alcohols suitable for blending into a clean burning, reformulated gasoline. The steps comprise: fast pyrolysis of refuse-derived fuel or biomass to oil vapors; catalytic cracking of the oil vapors to maximize the yield of mixed olefins; conversion of the mixed olefins to isobutene and isopentene; and reaction with alcohol and/or water with the isobutene and isopentene to form the corresponding ethers. These ethers, inclusive of methyl tertiary butyl ether (MTBE), when added to gasoline, provide a distinct lowering of unburned hydrocarbons and carbon monoxide in the exhaust of vehicles burning gasoline, and this is of considerable importance in view of the fact that the U.S. Congress in the Clean Air Act of 1990 mandated the use of oxygenated fuels in areas that have had severe air pollution problems. The inclusion of these ethers as a component of gasoline are also important for the reason that, the Environmental Protection Agency has ordered the reduction of the vapor pressure of gasoline produced for use in the summer, and refineries complying with these orders are left with a surplus of butane, which requires petroleum refineries to install facilities to convert the surplus butanes into MTBE or other olefins convertible to ethers similar to MTBE for use in gasoline.

2. Description of the Prior Art

Biomass is a potentially inexhaustible raw material for biofuels as well as a stable and independent alternative to petroleum, and this is particularly true during an oil crisis. Biofuels can cover a wide range of liquid fuels that may be produced by either biochemical or thermochemical conversion processes, and the thermochemical conversion of biomass to liquid fuels can occur indirectly by gasification, or directly by pyrolysis or liquefaction. Biomass pyrolysis and the subsequent upgrading of pyrolysis vapors to gasoline-like hydrocarbons has recently received considerable attention; however, an inherent problem associated with this process is removing oxygen in biomass and increasing its hydrogen content to form liquid fuels. This difficulty can be correlated to an effective hydrogen index (EHI), which is defined by Haag et al., "Catalytic Production of Aromatics and Olefins from Plant Materials" in Prepr. Div. Pet. Chem., Am. Chem. Soc. 25, 650–656 (1980). where H, O, N, S, and C are the relative numbers of atoms of hydrogen, oxygen, nitrogen, sulfur, and carbon in the feedstock.

In the case of cellulose, which has an empirical formula of $(C_6H_{10}O_5)_n$, it should be observed that the EHI equals zero. Hardwood [(e.g., $C_6H_9O_4)_n$] and refuse-derived fuel (RDF) [(e. g., $C_{15}H_{24}O_8)_n$] have EHIs of approximately 0.2 and 0.5, respectively.

In biomass pyrolysis, in which no reducing agent such as $H_2$ or CO is present, oxygen must be removed as $CO_2$ or CO in order to increase the hydrogen content of the products, J. P. Diebold et al., "Biomass-to-Gasoline (BTG): Upgrading Pyrolysis vapors to Aromatic Gasoline with Zeolite Catalysts at Atmospheric Pressure" in *Pyrolysis Oils from Biomass*, ACS Symposium Series 376, 264–276, ed. E. J. Soltes and T. A. Milne, Washington: ACS, 1988.

Because biomaterials are structurally and chemically complex, biomass thermochemical conversion processes can result in complex and unstable species and fractions. For example, about 230 compounds have been reported to be present in the pyrolysis products of softwood and hardwood, E. J. Soltes et al., *Organic Chemicals from Biomass* 64, ed. I. S. Goldstein, Boca Raton, Fla.: CRC Press, 1981. Upgrading of these products to stable and more valuable fuels and chemicals represents a new challenge to catalysis, New York, Chen et al., *Shape Selective Catalysis in Industrial Applications*, New York: Marcel Dekker, 1989.

Further, while pyrolysis products can be thermally cracked to form about 15% by weight $C_2^+$ hydrocarbons, large amounts of methane and hydrogen are also produced, and this lack of specificity has led to the abandonment of the thermal cracking approach and to an increased ongoing effort in the catalytic cracking area.

Mixed polyolefin plastic scraps are converted to low pour point oils by thermal cracking in the liquid phase followed by catalytic conversion of the vapors over a zeolite catalyst, in U.S. Pat. No. 4,851,601. The process in that patent is limited to only mixed polyolefin plastics as feedstocks, and it is indicated that halogenated polymers such as polyvinyl chloride should not be used in order to avoid catalyst deactivation. Thermal cracking of the plastics is carried out in the liquid phase at temperatures between 420°–470° C. The second stage catalytic conversion reaction is carried out at a temperature range of 250°–340° C. In the second stage catalytic conversion, the weight hourly space velocities (WHSVS) preferred are between 0.75–1.0. The hydrocarbon oil product has a boiling range above 165° C. and a low pour point. Product analysis shows 38.4% paraffins, 54.7% olefins, and 4.5% aromatics, and most of the hydrocarbons are in the $C_5^+$ range.

U.S. Pat. No. 4,308,411 utilizes ZSM-5 catalysts in order to upgrade biomass pyrolysis vapors. In particular, the process is directed to conversion of organic waste (cellulosic fraction of municipal solid waste) to hydrocarbons. The pyrolysis is conducted at a temperature of at least 300° C. to form a mixture of oxygenates, followed by deoxygenation using a zeolite catalyst. More specifically, the examples deal with pure model oxygenates such as α-methylglucoside ($C_7H_{12}O_5$) and tetrahydrofurfuryl alcohol (THFA, $C_5H_{10}O_2$). Both of these oxygenates are slightly hydrogen rich feedstocks (EHI's of 0.29 and 1.2). The catalytic reactor temperature range is between 275°–425° C. with a WHSV of 1–10 $hr^{-1}$. The catalyst is an intermediate pore size zeolite having a pore diameter of between 5.3–6.0 Å. The products obtained from this process of conversion include 15% char, 11% catalyst coke, 20% gaseous products, 24% water soluble organics, and 30% organic liquids. Upon analysis, the organic liquids were found to be 52% aromatic.

A process for catalytic conversion of biological materials to liquid hydrocarbons is disclosed in U.S. Pat. No. 4,300,009. The biological materials have an effective hydrogen index (EHI) of at least 1.0 and preferably greater than 1.3. The examples in this patent are pure biological feedstocks such as natural rubber latex, limonene, squalene, corn oil, peanut oil, castor oil, jojoba oil and tall oil. The catalytic reactor temperature range is between 300°–650° C. with a reactant WHSV of 0.2–20.0 $hr^{-1}$. The catalyst is a crystalline zeolite having a pore diameter greater than 5.0 Å. The products obtained include paraffinic, olefinic, and aromatic hydrocarbons; however, there is no selectivity towards one specific product or one group of hydrocarbons.

Chen et al. disclose working with model compounds (acetic acid and methylacetate) and affecting pyrolysis liquid upgrading in a fluidized bed apparatus in *"Fluidized Bed Upgrading of Wood Pyrolysis Liquids and Related Compounds"* ACS Symposium Series 376, 277–289. A ZSM-5 catalyst in a silicaalumina binder is used, at a temperature of 410° C. and a WHSV of 1–2 $hr^{-1}$. The products obtained were 0.7% CO, 10.5% $CO_2$, 70.7% water, 2.5% $C_1$–$C_4$ hydrocarbons, 6.0% $C_5^+$ hydrocarbons, and 9.6% coke.

None of the foregoing prior art processes uses refuse derived fuel (RDF) which contains all plastic waste including polyvinyl chloride (PVC), in addition to organic wastes; and these processes would of necessity incur extra cost in order to separate these plastics. Moreover, only a limited WHSV is utilized in the processes of the prior art references, and this results in lower selectivity towards olefins.

Further still, there is no indication in the prior art that the feedstock may have an EHI as low as zero, and the relatively low catalytic reactor temperatures of the prior art results in higher coke yields and lower yields of gaseous products, without any unique product selectivity of lower molecular weight $C_2$–$C_5$ olefins.

As a further encumbrance, none of the prior art processes are directed to pyrolysis and upgrading performed in the same system; they are therefore less capable of preventing any possible repolymerization or condensation reactions that would result in lower coke formation on the catalysts.

There is a need in the general art of pyrolysis and upgrading of biomass and wastes to provide means for conversion of refuse-derived fuels which contains all plastic wastes (inclusive of polyvinyl chloride) in addition to organic wastes, so that no extra costs are encountered for separation of these plastics, and whereby chlorine in the polyvinyl chloride is converted to HCl without causing catalyst deactivation.

There is a further need in the general art of pyrolysis and upgrading of biomass and wastes to utilize a wider range of space velocities that are more favorable in large scale industrial operations and result in higher selectivity towards olefins, and whereby selectivity towards low molecular weight $C_2$–$C_5$ range olefin products is achieved by using an appropriate catalyst.

A yet further need in the general art of pyrolysis and upgrading of biomass and wastes is the need to utilize a feedstock having an effective hydrogen index (EHI) as low as zero, high catalytic reactor temperatures in the range of about 450°–550° C. in order to provide lower coke yields and higher yields of gaseous products and at the same time provide unique product selectivity to low molecular weight $C_2$–$C_5$ olefins, by selection of appropriate zeolite catalysts.

There is a yet further need in the general art of pyrolysis and upgrading of biomass and wastes to achieve pyrolysis and upgrading in the same system, in order to prevent any possible re-polymerization or condensation reactions, in order to provide lower coke formation on the catalyst, while obtaining higher yields of hydrocarbons and lower yields of water.

SUMMARY OF THE INVENTION

Accordingly, it is one object of the present invention to utilize zeolite catalysts for catalytic conversion of biomass and wastes that will enhance selectivity of low molecular weight $C_2$–$C_5$ range olefin products.

It is another object of the present invention to provide a process for utilizing the aforementioned zeolite catalyst on a feedstock comprising refuse derived fuel, which contains all plastic wastes including polyvinyl chloride and organic wastes, so that no extra costs of separation of these plastics is required, and so that any small amount of chlorine present in any polyvinyl chloride included in said wastes may be converted to HCl and not cause deactivation of the catalyst.

Another object of the present invention is to provide a process for affecting pyrolysis and upgrading of biomass and wastes utilizing a wider range of space velocities (1–10 $hr^{-1}$), that are more favorable in an industrial operation and results in higher selectivity towards olefins.

A yet further object of the present invention is to provide a process for pyrolysis and upgrading of biomass and wastes in which the feedstock or waste may have an effective hydrogen index (EHI) as low as 0, using higher catalytic reactor temperatures in the ranges of about 450°–550° C. so that lower yields of coke and higher yields of gaseous products are provided.

A still further object of the invention is to provide a process for pyrolysis and upgrading of biomass and wastes, wherein pyrolysis and upgrading are obtained in the same system, in order to prevent any possible re-polymerization or condensation reactions that will result in lower coke formation on the catalysts.

A further object yet still of the invention is to utilize a multi-step process for converting biomass and refuse derived fuel into ethers and/or alcohols suitable for blending into a clean burning, reformulated gasoline by taking the oil vapors from fast pyrolysis and catalytically cracking the vapors to maximize the yield of mixed olefins, converting the mixed olefins to isobutene and isopentene, and reacting an alcohol and/or water with the isobutene and isopentene to form the corresponding ethers, which are then blended into gasoline in order to effect a distinct lowering of unburned hydrocarbons and carbon monoxide in vehicle's exhaust as well as a reduction of the vapor pressure of the gasoline containing ethers.

BRIEF DESCRIPTION OF THE DRAWINGS

The accompanying drawings, which are incorporated in and form a part of the specification, will illustrate preferred embodiments of the present invention, and together with the description, will serve to explain the principles of the invention. In the drawings.

DETAILED DESCRIPTION OF THE INVENTION

Figure 1:
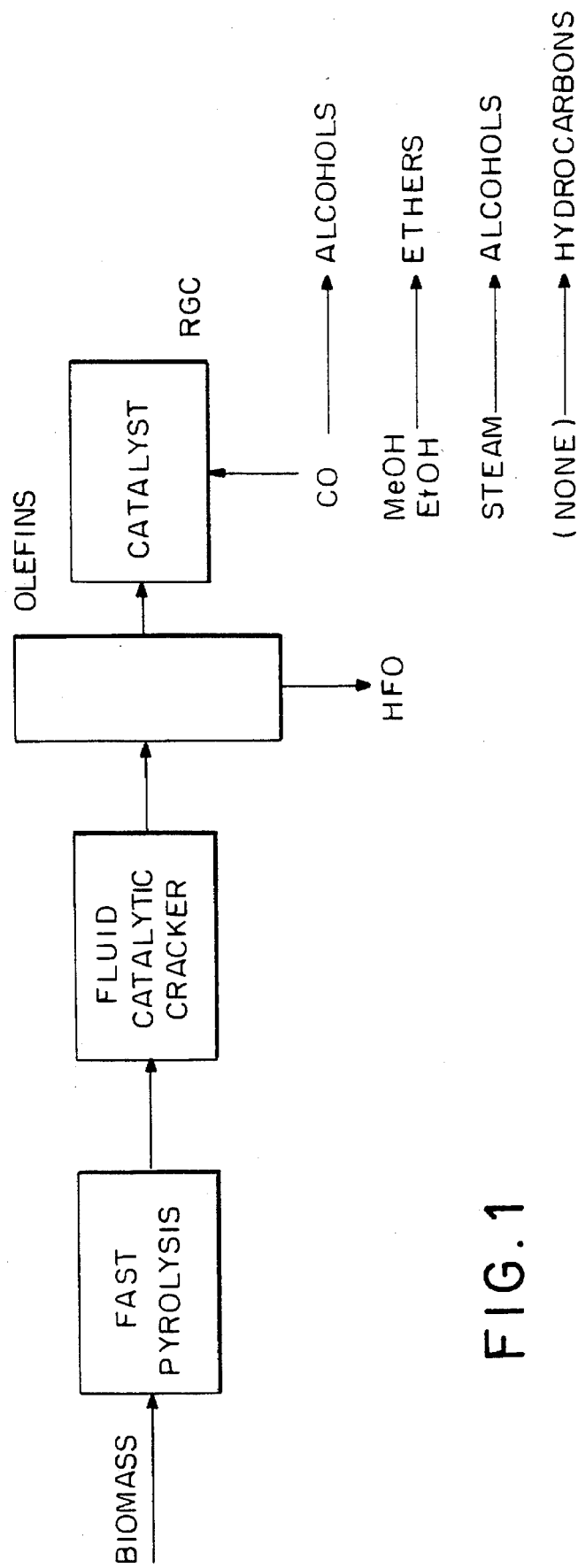
FIG. 1 is a flow chart depicting subjecting biomass or RDF from municipal solid waste to the process of the invention in order to obtain final liquid products for reformulated gasoline components (RGC)

Through the use of thermochemical conversion, biomass or Refuse Derived Fuel (RDF) is converted to hydrocarbons or oxygenates for use as reformulated gasoline components (RGC). Fast pyrolysis is first used to thermochemically convert biomass or RDF to volatile intermediate oil vapors, and these vapors are immediately fed to a catalytic cracking reactor and cracked to low molecular weight hydrocarbons for processing. The final liquid products from this process may be selected from alcohols, ethers, or hydrocarbons, as can best be seen from the schematic flow chart of FIG. 1, where either biomass or Refuse Derived Fuel is subjected to fast pyrolysis followed by catalytic upgrading of pyrolysis vapors using zeolite catalysts. In the primary catalytic upgrading step, catalyst formulation and reactor operating conditions are optimized for maximum yield of olefins. In a secondary step, the olefins, upon reaction with water or lower alcohols such as methyl alcohol (MeOH) or ethyl alcohol (EtOH), are converted to oxygenated fuels, and these fuels have excellent blending properties as reformulated gasoline components (RGCs), that provide octane enhancement, reduced hydrocarbon and CO emissions, and have lower atmospheric reactivity.

Figure 2:
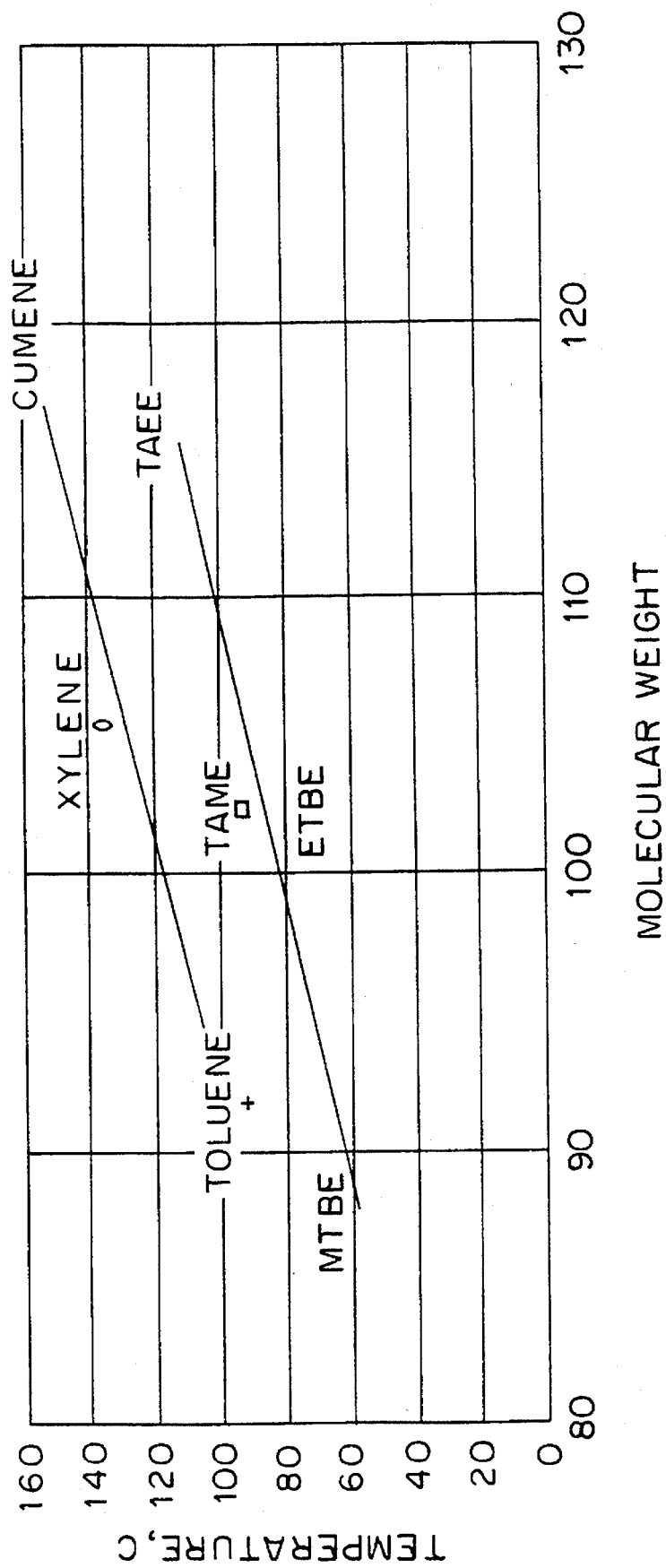
FIG. 2 shows the desired products of the process of the invention, which boil in the same temperature range as gasoline.

By virtue of this invention, a variety of RGCs may be produced, ranging from fuel alcohols or mixtures thereof to ethers; however, among the potential products of the process are ethers boiling in the same temperature range as gasoline. As shown in FIG. 2, this includes methyl and ethyl ethers of isobutylene and isoamylene, e.g., MTBE, tertiary amyl methyl ether (TAME), ethyl tertiary butyl ether (ETBE), and tertiary amyl ethyl ether (TAEE). Byproducts will include small amounts of toluene, xylenes, and cumene, which are valued more highly than unleaded gasoline because of their high octane value and their competing chemical value.

Figure 3:
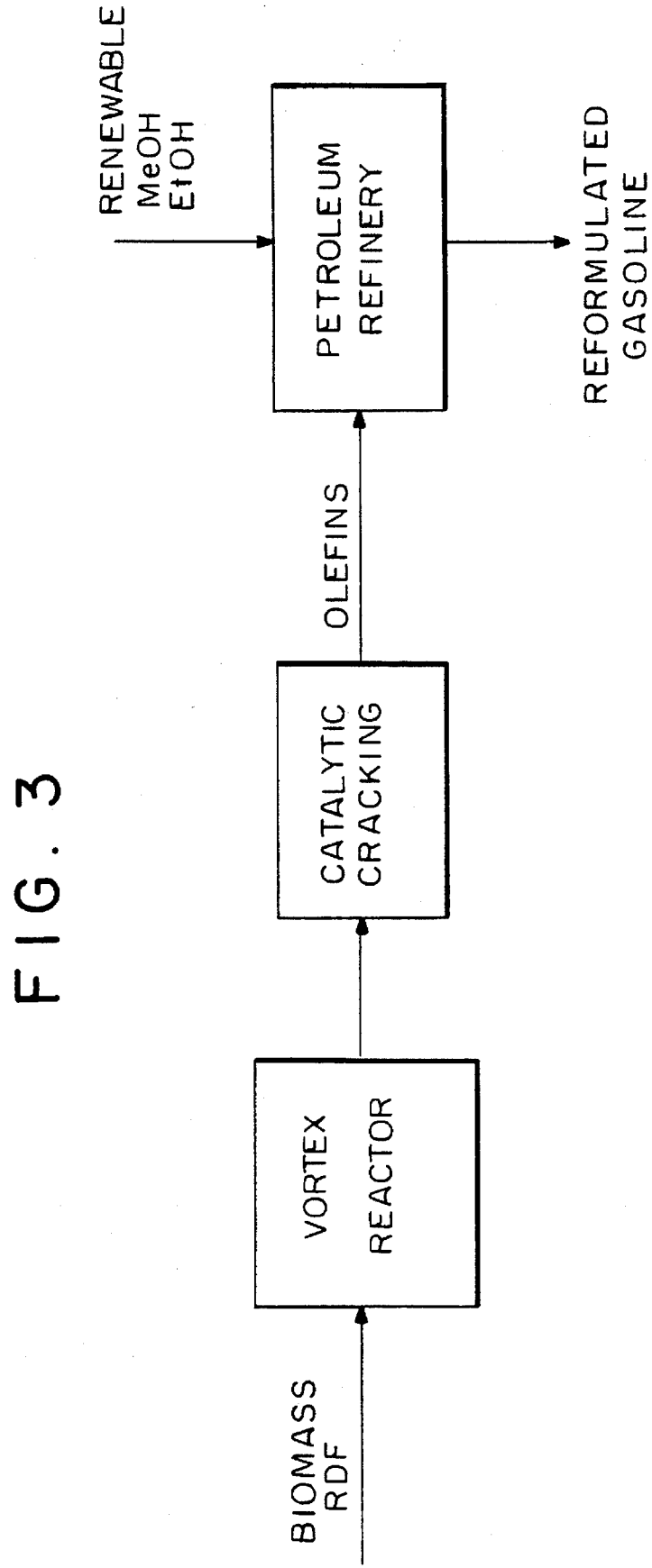
FIG. 3 shows a flow diagram for ethers prepared from biomass according to the invention, wherein fast pyrolysis is conducted in a vortex reactor, and catalytic cracking of the pyrolysis vapors is used to obtain olefins for petroleum refining to arrive at reformulated gasoline components.

In essence, fast pyrolysis of biomass is used to maximize the formation of oxygenated crude oil vapors, which are promptly catalytically cracked to intermediate compounds. The intermediate compounds are then converted to the desired reformulated gasoline components (RGCs) in an additional commercially-proven catalytic stage with water, methanol, or ethanol as the co-reactants. The alcohols could also be from renewable feedstocks by processes known to the art. This concept is shown in FIG. 3, which illustrates how the biomass pyrolysis process can be linked with the existing oil refinery structure.

When gasoline containing methyl tertiary butyl ether (MTBE) is burned in an engine of a vehicle, there is a distinct lowering of unburned hydrocarbons and carbon monoxide in the exhaust of these vehicles compared with conventional gasoline containing only hydrocarbons. Moreover, the utilization of other olefins to make ethers similar to MTBE for use in gasoline, due to the complex nature of gasoline, provides similar clean burning benefits. Further, the ethers do not need to be in a pure state, but may be blended into gasoline as a relatively crude mixture of mixed ethers.

Through the choice of catalysts and reactor conditions, the relative yields of ethers to aromatics are controlled by selecting process conditions to maximize the yield of ethers.

The basic steps involved are: feedstock drying; fast pyrolysis in a vortex reactor; catalytic cracking of the pyrolysis vapors; oligomerization of the gaseous olefins to butenes and pentenes; isomerization of the linear olefins to the reactive iso-olefins, and the addition of an alcohol to the isoolefins to form the ethers. Rather than reacting the iso-olefins with an alcohol, if desired, water can be added in the last step to produce an alcohol, e.g., tertiary butyl alcohol (TBA). The thermal requirements of the process are supplied by the combustion of by-product char, light gases, water soluble organics, and heavy distillation residues.

An oxygenated, gasoline blending stock is the sole product contemplated by the invention, although small amounts of aromatics may be recovered as pure chemicals. Moreover, this oxygenated gasoline blending stock is compatible with currently discussed versions of reformulated gasoline, and although MTBE is currently being used, due to the similarity of the remaining ethers boiling in the gasoline range (i.e., MTBE, ETBE, TAME and TAEE), these ethers and any others that can economically be made and which produce acceptable octane values will be acceptable RGC's.

The as-received biomass or RDF is in a wet state of about half water and half organic material. Prior to feeding this material into the pyrolysis reactor, the material is dried using available waste heat. The purpose of the drying step is to reduce the amount of waste water being generated and to reduce the thermal load of the pyrolysis reactor. The RDF processing plant utilizes a rotary dryer, due to the heterogenic nature of RDF. In this rotary kiln dryer, the RDF is tumbled and exposed co-currently to hot flue gases tempered with warm air from an air-cooled heat exchanger. The RDF is heated to 105° C. and achieves moisture equilibrium with warm, moist air exiting the dryer.

In biomass processing, wood in the form of chips is used. The biomass chips are dried in a silo dryer similar in nature to those used to dry grain, but operated at slightly higher temperatures.

The dried feedstock is then immediately fed into a carefully controlled vortex pyrolysis reactor in which the feed is ablatively pyrolyzed to maximize yields of low molecular weight vapors, minimize thermal cracking of the vapors to light gases, and to minimize char formation. Solids are recycled in the vortex reactor until attrited to a finely powdered char, which is then used as fuel for the pyrolysis furnace along with waste gases. The walls of the vortex reactor are heated to 625° C., which produces a temperature of about 500° C. in the exiting process stream. The pyrolysis furnace is fueled with the byproduct distillation residue, char, and gases that contain sulfur and chlorine, and most metals present in the feedstock. Most of the ash is removed as slag from the bottom of the furnace, and the addition of lime to the furnace to sequester the acid gases may be necessary with RDF feed, along with a bag house to collect the fly ash and calcium salts, when using either feed.

Figure 4:
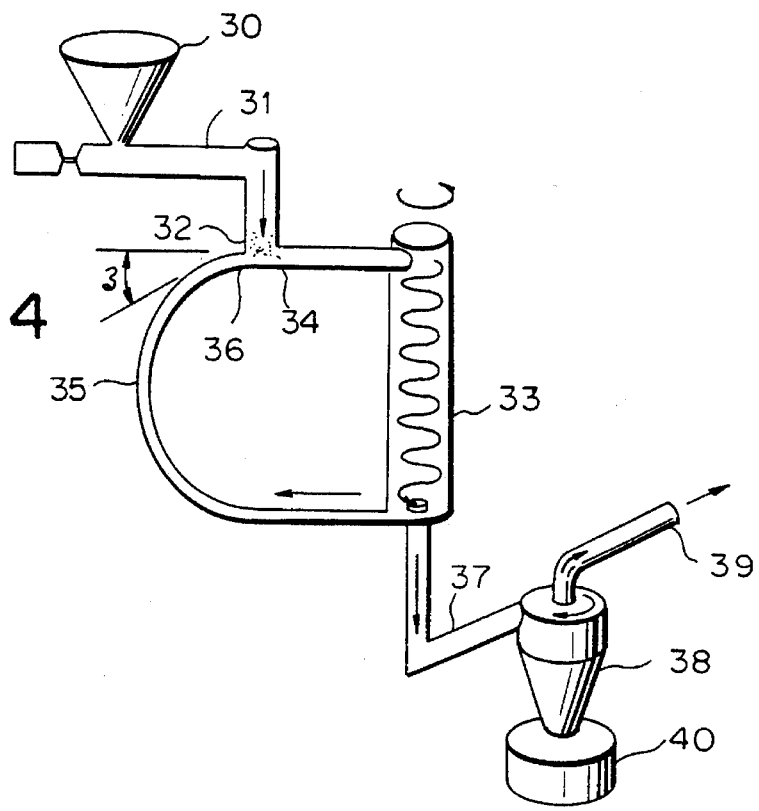
FIG. 4 illustrates the kinetic energy conserving ejector design of the vortex reactor system of the invention.

In FIG. 4, biomass chips 30 are fed into a screw feeder 31, whereupon a motive or carrier gas 32 at temperatures of about 525° C. carry the particles into the entrance of a vertically oriented vortex reactor 33, and wherein the vortex reactor wall is heated at a temperature of about 625° C. The partially pyrolyzed feed and large char particles exit the reactor through a tangentially-located exit and are pneumatically conveyed by the recycle loop 35 to the ejector 36. The main flow of the carrier gas, the pyrolysis gases, and the finely attrited char leave the vortex reactor through the axial outlet. By routing the recycled solids and gases directly to a steam ejector 34, the deposition in the feeder adaptor and resultant plugging of the system were eliminated. Through the use of this novel vortex reactor kinetic energy conserving ejector design system, there are two, rather than the customary or prior art one, low pressure streams entering the ejector, i.e., the feedstream and the recycled solids stream.

The feedstream only has the velocity created by falling a short distance, and it is relatively unimportant at what angle it meets the supersonic jet of the steam ejector. Therefore, the feeding portion of the novel ejector is that of a conventional ejector for the entrainment of solids with a carrier gas, i.e., the feed enters the ejector at 90° to the supersonic jet.

In this connection, it should be appreciated that there is a considerable amount of kinetic energy in the solids recycle loop 35, as it travels at a typical speed of about 100 m/s (200 mph). Accordingly, it is important to the efficiency of the operation of the vortex reactor system to conserve this kinetic energy. In further regard to FIG. 4, it should be noted that, in the method of the invention, the high-speed recycle loop enters the ejector between the motive-gas nozzle and the venturi throat 36 at an acute angle $\zeta$ (zeta), which is about 30° or less and in same general direction as the high velocity motive gas. In this manner, the amount of change in direction of the recycle loop is minimized within the ejector, with a minimal amount of particles impacting the walls of the ejector at large angles. By reducing the angle of the recycle loop with the supersonic jet, the particles that are not completely turned by the jet tend to ricochet off the wall, rather than transferring their kinetic energy to the wall by impact. This minimizes the transfer of energy from the recycle stream to the walls of the ejector and also reduces the tendency for the ejector to become eroded from the impact of high velocity particles. The temperature of the exit connection 37 between the vortex reactor and the hot char cyclone 38 is about 500° C. and the exiting pyrolyzing vapors 39 are at a temperature of about 450° C. As in the case of the prior art, the receiver 40 receives char particles of a size of about −50 μm char.

Depending upon the nature of the feedstock, metal and/or abrasive materials can be introduced along with the feed into the vortex reactor; however, these tramp materials do not pyrolyze, and they are not easily attrited to fine powders and re-entrained with the gases leaving the axial outlet of the vortex reactor. In this connection, it should be noted that most three-way valves for use in connection with process streams are constructed to force the process stream to turn 90° either to the right or to the left; however, this conventional arrangement would not work in the context of the present invention, inasmuch as it would result in very rapid destruction of such a three-way valve, due to the continued sharp turn of the erosive particles involved.

The invention construction utilizes an unusual threeway valve in a manner such that it allows the free-unrestricted flow of gases and solids in the recycle loop to pass straight through. When it is desired to remove tramp metals and other non-pyrolyzable material from the reactor, the biomass feed is temporarily discontinued for a few seconds to permit biomass already in the reactor system to be completely pyrolyzed. At this point, the only solids being recirculated in the reactor system are the tramp metals and other inert materials. Reference is now made to the embodiment depicted in FIG. 5, where a special three-way valve 40 is rotated 90° to permit the recycle stream to be diverted to flow through a special inert cyclone separator 41 to remove the undesirable solids and return the cleaned gas stream to the recycle loop 42 downstream of the three-way valve to result in virtually no change in the pyrolysis system pressures. The recovered solids are accumulated in and are removed from a receiver vessel 43 attached to the bottom of the special cyclone separator. After this very brief period of removal of the tramp materials, the valve is returned to the straight-through position, and biomass chips 44 are returned to screw feeder 45 where a motive gas 46 such as steam impels the feed materials through the venturi of a steam ejector 47 at temperatures in the vicinity of about 525° C. As the feed materials enter the vortex reactor 48 through a tangential opening from a connecting outlet and impinge on an area just opposite the tangential entrance, a replaceable wear plate disposed at this location enables successful reduction of wear in the vortex reactor. As mentioned, the vortex reactor wall is heated to about 625° C., and the exiting connector 49 between the vertically disposed vortex reactor and the hot char cyclone 50 has a temperature of around 500° C., and this results in pyrolysis vapors 51 having temperatures about 450° C. exiting from the outlet of the hot char cyclone. The char receiver 52 disposed at the base of the hot char cyclone collects char particles of sizes in the vicinity of about −50 μm. Again, as in the embodiment shown in FIG. 4, the solids recycle loop enters the ejector between the motive-gas nozzle and the venturi throat at an acute angle ζ (zeta) and in the same general direction as the high velocity motive gases.

Figure 5:
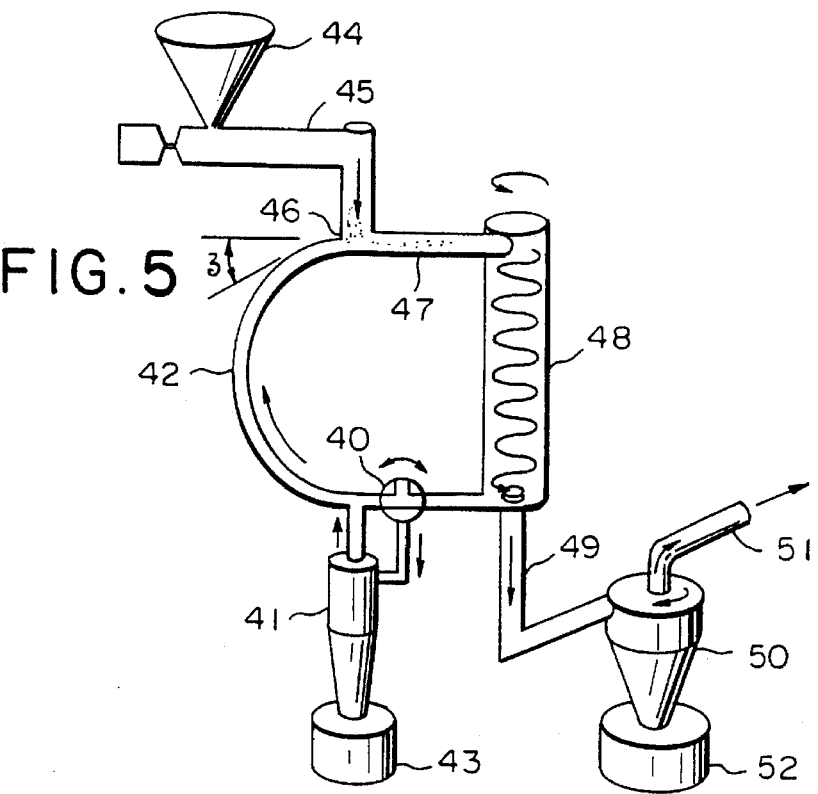
FIG. 5 illustrates the vortex reactor system of the invention utilizing a three-way valve to remove inerts from the recycle loop.

In the context of the improved vortex reactor system of the invention, the removal of tramp metals and other debris has been demonstrated utilizing a custom-made three-way plug valve as shown in the embodiment of FIG. 5; however, it is also contemplated within the ambit of the invention to utilize several equally applicable and obvious variations of this inventive concept in order to remove tramp metals and other debris. For example, a separate tangential exit located in the vortex reactor for dumping out the tramp material would work equally as well. Similarly, an aerodynamic valve on the recycle loop or two two-way valves may be located in the recycle loop. In the case of utilizing two two-way valves, one of the two-way valves would be located so that it would open and close the recycle loop and the other two-way valve would be attached to the recycle loop at right angles. In order to dump material out of the recycle loop, the right angle attachment or side valve would be opened, and the in-line valve would be closed. It is obvious that this two two-way valve arrangement would function equivalently to a three-way valve.

The method for removing tramp material of the invention may be accomplished by the use of a cyclonic separator to separate the tramp solids from the gases, with return of the gases to the recycle loop, as discussed in the three-way valve system.

The high temperature flue gases from the pyrolysis furnace are used to sequentially supply the heat for the steam superheater, the incineration zone, the boiler, and the recuperator. The preferred carrier gas for this process is steam, which makes the recovery of the liquid products much easier than if they are in a non-condensable carrier gas. To avoid making a large amount of waste water, the condensed steam, organic contaminants, and by-product water are recycled to the boiler to raise steam for the carrier gas used in pyrolysis. This boiler water recycling also concentrates the organics (primarily phenolics) prior to incineration. Water is boiled off from the condensates, with the concentrated organics forming a dense fluid phase in the bottom of the boiler. The concentrated organics along with the water chemically formed in the process are blown down to the incineration zone of the furnace operating at temperatures above 815° C. (1500° F.).

Figure 6:
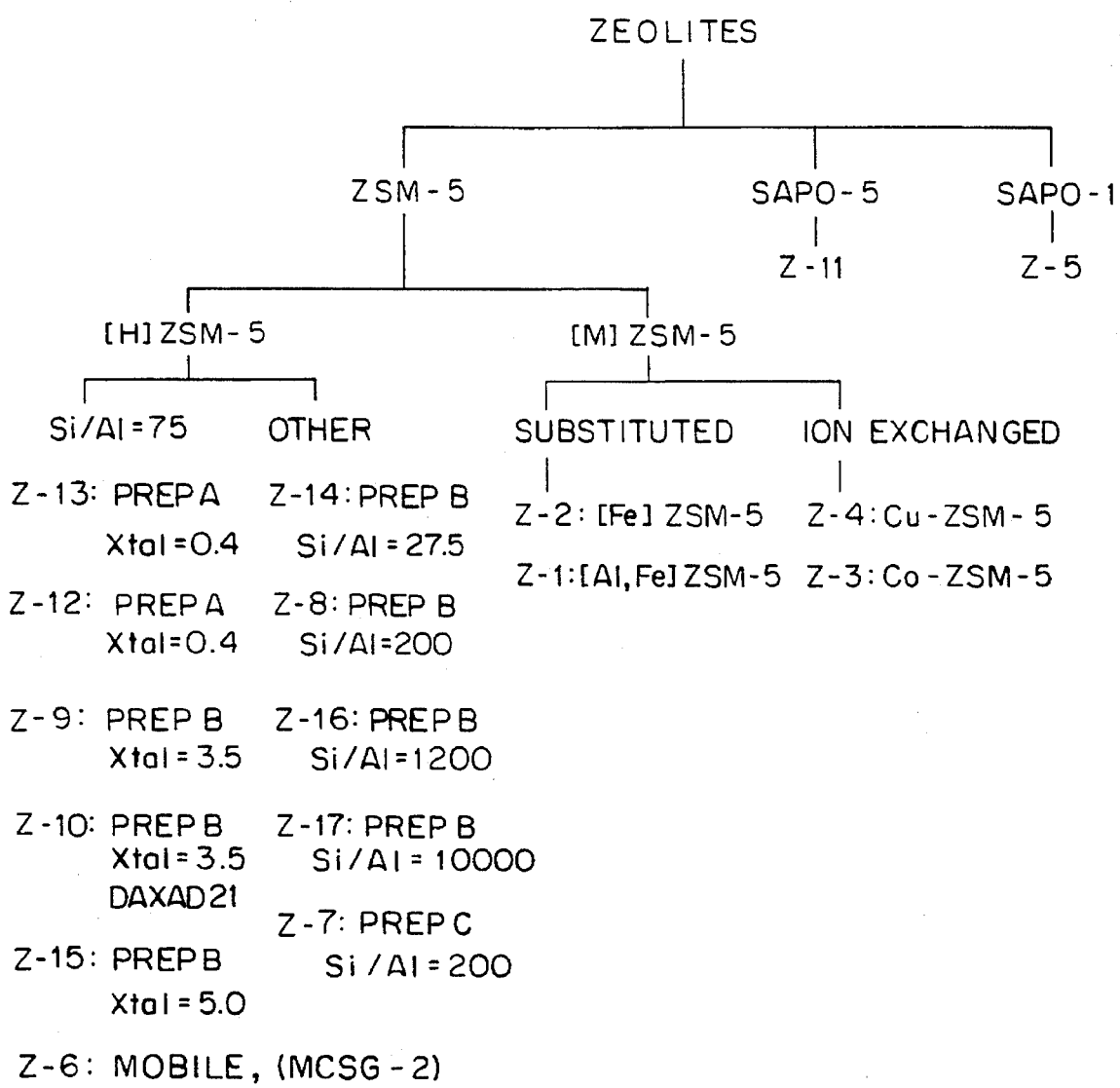
FIG. 6 is a dendogram of zeolite catalysts used in the context of the invention, and Si/Al in this figure only, is an abbreviation for the molecular ratio of $SiO_2$ to $Al_2O_3$.
Figure 6B:
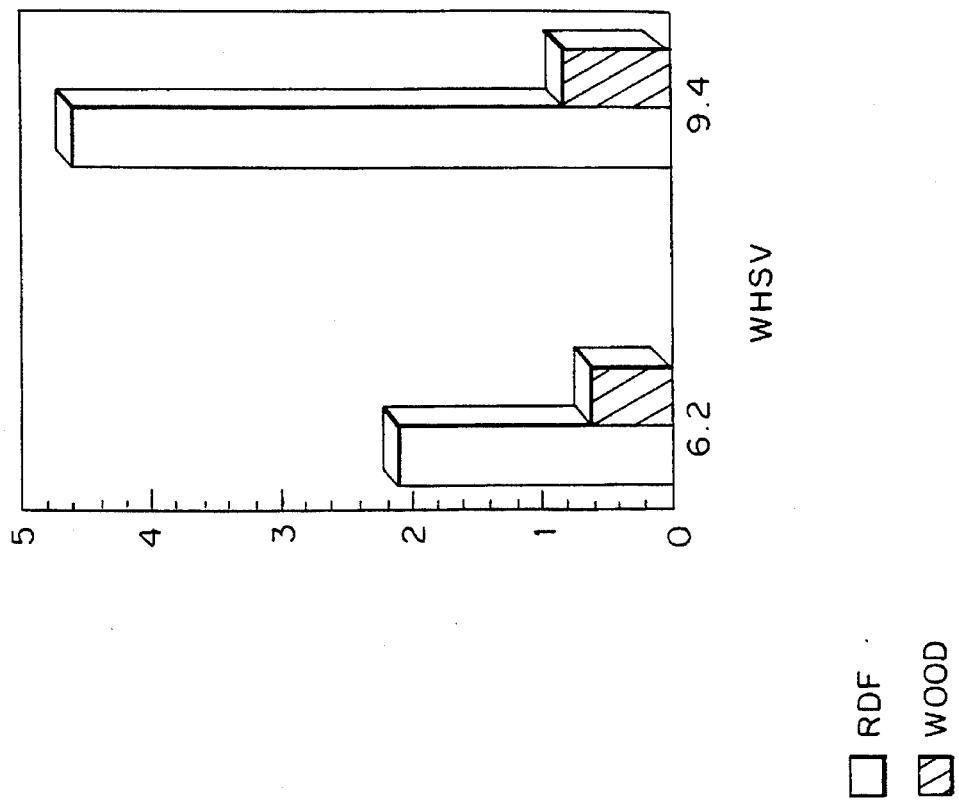
FIG. 6B is a bar graph showing the olefins/aromatics ratio for RDF verses wood.
Figure 6A:
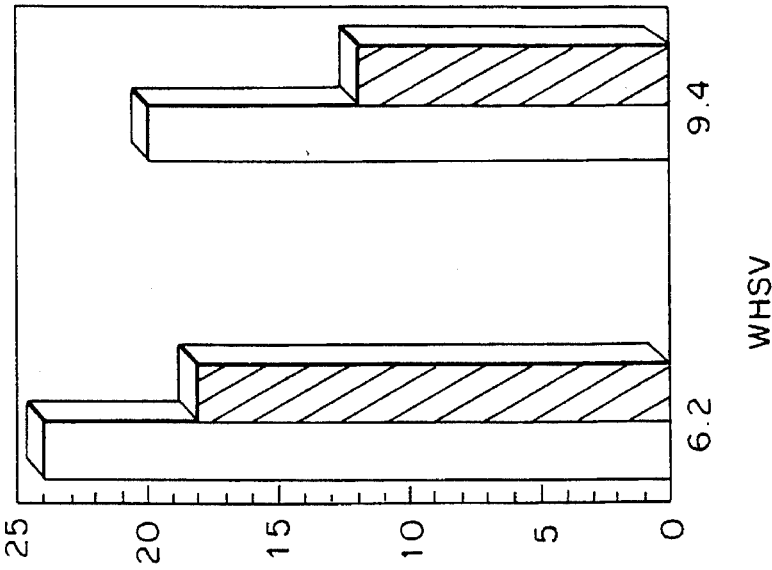
FIG. 6A is a bar graph showing yields from RDF verses woods.

After the pyrolysis vapors, gases, and carrier steam pass through the hot char cyclones to remove fine char, they enter the catalytic cracking reactor. This reactor is a riser cracker (recirculating entrained bed) with a 1 to 2 second contact of the pyrolysis vapors with zeolite catalysts such as zeolite catalyst HZSM-5 or an improved zeolite catalyst, as shown in the dendogram of zeolites utilized in FIG. 6. Space velocities of 5 to 10 pounds of organic feed per hour per pound of catalyst result in the highest production of olefins. The temperature of the cracking reactor is in the range of 500 to 525° C., and the reactions are mildly exothermic and result in a 20° to 50° C. temperature rise. This is in contrast to a typical catalytic cracking unit, which must be continually heated with hot catalyst to provide the endothermic heat of reaction of cracking hydrocarbons.

The catalyst regenerator will be a fluidized bed, and the regenerator temperature will be regulated by the raising of additional steam. The carbon monoxide rich flue gas from the catalyst regenerator is fed to the incinerator section of the furnace to insure a long residence time for complete combustion.

After the process stream leaves the primary cracking reactor, it is cooled to condense most of the steam and the small amount of hydrocarbons heavier than benzene. The permanent gases, gaseous olefins, and the small amount of benzene vapor are then compressed to about 100 psig pressure. The gases then enter the fixed-bed secondary catalytic reactor, where the olefins alkylate the benzene to form primarily cumene (used as high octane aviation gasoline). This step effectively removes benzene from the product mixture, and the remaining olefins oligomerize under these conditions to form butenes and pentenes. These reactions are exothermic, but the relatively large amount of inert gases present effectively moderate the temperature in this adiabatic reactor at around 300° C.

Hot vapors from the secondary catalytic reactor next enter the distillation column where they supply the heat for distillation. In the upper part of the distillation column where the butenes and pentenes are in liquid form, the trays are replaced by cloth bags containing catalyst. Alcohol is then introduced into this zone to react with the olefins to form ethers at around 75° to 100° C. The ethers have a lower volatility than the reactants and drop out of the reaction zone to be removed at a lower tray as the major part of the gasoline product. Since the etherification reactions are equilibrium limited, the removal of the ether products from the reaction zone favors the ether formation.

The catalyst system performs the etherification reaction and isomerizes the linear olefins to the reactive iso-olefins, preferably in the same reactor.

Rather than using an alcohol, water may be used as a reactant with the reactive iso-olefins to make the corresponding tertiary alcohols. Unreactive butanes and pentanes along with gas oil are recycled to the cracking unit to be transformed into reactive intermediates. A small amount of polycyclic aromatic oil may be drawn off the bottom of the distillation tower and may be burned for fuel, hydrocracked to gasoline in a refinery, or sold as a #6 fuel oil.

The yields of ethers from RDF and biomass were initially projected using data generated with a 1-gram catalytic reactor and a molecular beam mass spectrometer which showed that the yield of olefinic and aromatic hydrocarbons made from pyrolysis vapors could be varied over a wide range of values depending upon the catalyst used and the operating conditions.

Cases were considered for both wood and RDF as feedstocks, and the yields of ethers were found to be dependent upon the olefinic yields of the catalytic cracking unit, because subsequent reactors merely react the olefins, but do not produce more of them. The hydrocarbon yields used were based on the performance of HZSM-5, and catalyst C-17, but with the distribution obtained with catalyst C-14. The yields from wood were based on the conversion of the butane, found in the present case, to butene to increase the intermediate yields of butenes, The yields for hydrocarbons from RDF and for wood from the catalytic cracking reactor are shown in Table 1.

TABLE 1

| Compound | RDF | Biomass |
|---|---|---|
| Ethylene | 5.8 | 4.2 |
| Propylene | 3.9 | 2.8 |
| Butenes | 2.9 | 1.8 |
| Butane | — | 5.8 |
| Pentenes | 3.4 | 1.5 |
| Benzene | 0.3 | 0.7 |
| Toluene | 0.6 | 1.5 |
| Xylenes | 0.2 | 1.4 |

Table 1 reflects the intermediate hydrocarbon product yields for the preliminary mass balances to make ethers on a weight percentage dry, as-received feed basis.

In the secondary catalytic reactor, the benzene alkylation is assumed to proceed to completion, i.e., until all the benzene is converted to cumene. The oligomerization of ethylene and the remaining propylene yielded a mixture of pentenes (amylenes) and butenes.

In the distillation column, the ethers were assumed to be stoichiometrically formed from the olefins and alcohols. The catalytic isomerization of the olefins to the reactive "iso" form was assumed to occur to extinction. The product is a mixture of ethers, the small amount of cumene formed in the secondary catalytic reactor, and the small amounts of toluene and xylenes formed in the catalytic cracking reactor.

The higher yields of ethers with RDF are due to the higher olefinic yields from RDF. These higher olefinic yields are believed to be due to the presence of plastics in the RDF. This process has the promise of increased liquid yields while maintaining high product value with only a small increase in capital costs and these factors serve to make this process to make ethers relatively more attractive than making aromatic compounds for use in gasoline.

The use of RDF as a feedstock for conversion to RGC's is more advantageous than the use of biomass feedstocks due to the presence of plastics that increase the yields of olefins and consequently the yields of ethers. This is in contrast to biologically based processes, which cannot utilize the non-biodegradable plastic fraction of the RDF.

Nevertheless, disposal of solid residues from any processing using RDF requires care, because RDF usually contains various heavy metals that become concentrated in the process.

In the present invention, a shape-selective catalyst, which includes variations of ZSM-5 zeolites, for upgrading pyrolysis vapors is employed. As may be seen from FIG. 6, a total of seventeen catalysts representing three major classes of zeolites were synthesized and tested for the catalytic conversion of biomass.

Figure 7:
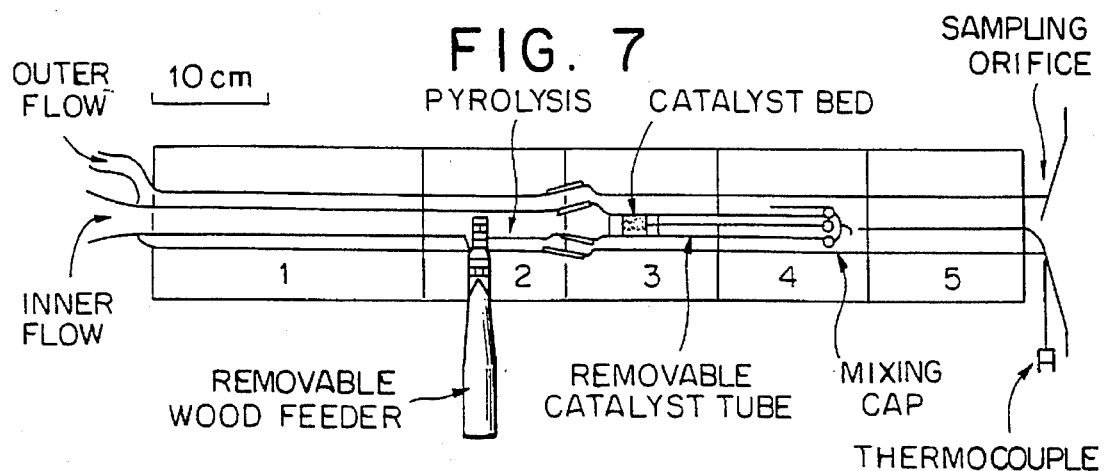
FIG. 7 depicts the set-up of the reactor utilized for catalyst screening tests.

The experimental arrangement of the reactor for catalyst screening tests is shown in FIG. 7.

These catalysts include straight ZSM-5s, modified ZSM-5s, and two silica alumina phosphate (SAPO) catalysts. Straight ZSM-5 catalysts were selected such that a wide range of crystal size and Si/Al ratios could be covered independently. A summary of the physical and chemical properties of the catalysts is given in Table 2. Blanks in the table indicate that measurements have not been made.

TABLE 2

| Catalyst ID | $SiO_2/Al_2O_3$ ratio | Crystalline size, $\mu$[1] | Acidity mmol/g[2] | Acid peak T, °C.[3] | Alpha activity |
|---|---|---|---|---|---|
| Z-13 | 75 | 0.4 | 0.4 | 446 | 188 |
| Z-12 | 75 | 0.4 | 0.4 | 446 | 438 |
| Z-9 | 70 | 3.5 | 0.38 | 453 | 240 |
| Z-14 | 27.5 | 3.5 | 0.75 | 474 | 1085 |
| Z-8 | 200 | 6.5 | 0.15 | 424 | 64.4 |
| Z-16 | 1200 | 3.5 | 0.03 | 390 | 5.5 |
| Z-17 | 10000 | 3.5 | 0.002 | 390 | 0.2 |
| Z-7 | 200 | 3.5 | 0.2 | 415 | 56 |
| Z-10 | 70 | 3.5 | 0.32 | 413 | 363 |
| Z-2 | ∞ | 4 | 0.1 | 342 | 11.7 |
| Z-15 | 70 | 5 | 0.42 | 423 | 275 |
| Z-1 | 25 | 6 | 0.57 | 450 | 84 |
| Z-5 | 0.3 | | 0.05 | | 6.8 |
| Z-11 | 0.5 | | 0.5 | 429 | 16 |
| Z-4 | 70 | 4 | 0.34 | 448 | 292 |
| Z-3 | 75 | 2.5 | 0.26 | | 51 |
| Z-6 | Mobil | | | | |

[1]As measured by scanning electron microscopy (SEM)
[2]Number of strong acid sites measured by the temperature programmed desorption (TPD) of ammonia
[3]Maximum temperature of strong acid peak measured by TPD of ammonia For feedstock preparation, two types of biobased materials were used: a hardwood sample (bass) provided as rods of 1/16-in. diameter for continuous feeding experiments, and, for batch experiments, it was cut into 1-in. pieces; and a sample of RDF designated National Teledyne Run 4 supplied by the National Institute of Standards and Technology, was provided in powder form (<0.5 mm) and used in batch experiments. Both samples were analyzed for their elemental compositions. The hardwood contained 48.14% C, 6.29% H, and 45.15% O (empirical formula of $CH_{1.57}O_{0.70}$). The RDF contained 36.72% C, 5.22% H, 35.30% O, 0.54% N, 0.50% Cl, and 26.98% ash (empirical formula of $CH_{1.71}O_{0.72}$).

Both biomass pyrolysis and its subsequent catalytic upgrading were performed in a two-stage, fixed-bed, quartz reactor interfaced with a molecular beam mass spectrometer (MBMS). Biomass was pyrolyzed in the first stage of the reactor before entering the catalyst bed. The dual flow feature allows the dilution of gaseous products for MBMS sampling as well as calibration with standard samples to be performed through the outer tube without disturbing the catalyst. The reactor setup is described thoroughly by T. A. Milne et al., "MBMS Studies of HZSM-5 Activity During wood Pyrolysis Product Conversion" in *Research in Thermochemical Biomass Conversion* 910–926, ed. A. V. Bridgewater and J. L. Kuester. New York: Elsevier Applied Science Publishers, 1988.

The MBMS allows the real-time detection of produce species as they change with catalyst activity. A detailed description of the MBMS system can be found in M. N. Soltys and T. A. Milne, Soltys, M. N. and Milne, T. A., *SERI Technical Report*, No. TR-622-1172, 1982.

In the process of the invention, the effect of thermal cracking is minimized by positioning the catalyst bed immediately adjacent to the pyrolysis zone. Control of the temperature of the pyrolysis and cracking zones is achieved by a 5-zone furnace surrounding the reactor. A schematic diagram of the reactor system is shown in FIG. 7.

The reactor system allows the introduction of feedstock in either a batch (pulse) mode or, in the case of wood, a continuous feeding mode at various rates. Steam and helium carrier gases are passed through the inner tube at various flow rates. The flow rate of steam is controlled by a setting on a 50 cc syringe pump.

In the catalyst screening tests with the MBMS, approximately 1.0 g of the ammonium form of the catalyst was sieved, and a mesh size of 25–45 (350–700 μm) was packed in the reactor between quartz wool on both sides. This particle size range was found to be in the optimal range to avoid any channeling or any large pressure drops across the bed. The catalyst was deammoniated in flowing helium, at 500° C. at 200 mL/min for 2 hours prior to the screening tests. The following steps were undertaken in testing of all catalysts:

1) A three-point calibration procedure of the MBMS response was performed through the outer tube (bypassing the catalyst bed) for major liquid and gaseous components found in the products. These consisted of a total of 11 components with concentrations covering the range found in the products. Argon was used as a tracer gas to normalize the response factors;

2) Pyrolysis of wood or RDF over the catalyst was performed in helium without steam. Three pulses of 30 mg samples were pyrolyzed.

Figure 8A:
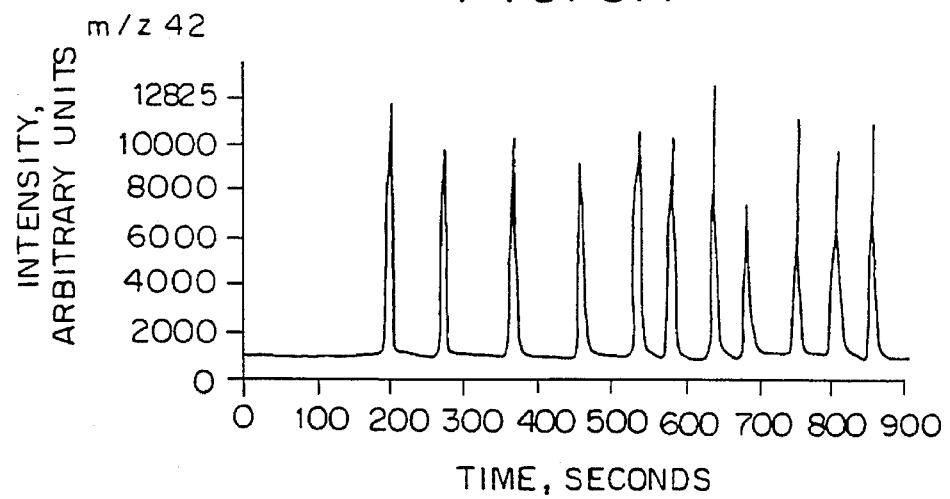
FIG. 8 shows consecutive pulses of hardwood at steady state over zeolite catalysts, where (a) M/Z is 42 or propylene, and (b) M/Z is 92 or toluene product behavior.
Figure 8B:
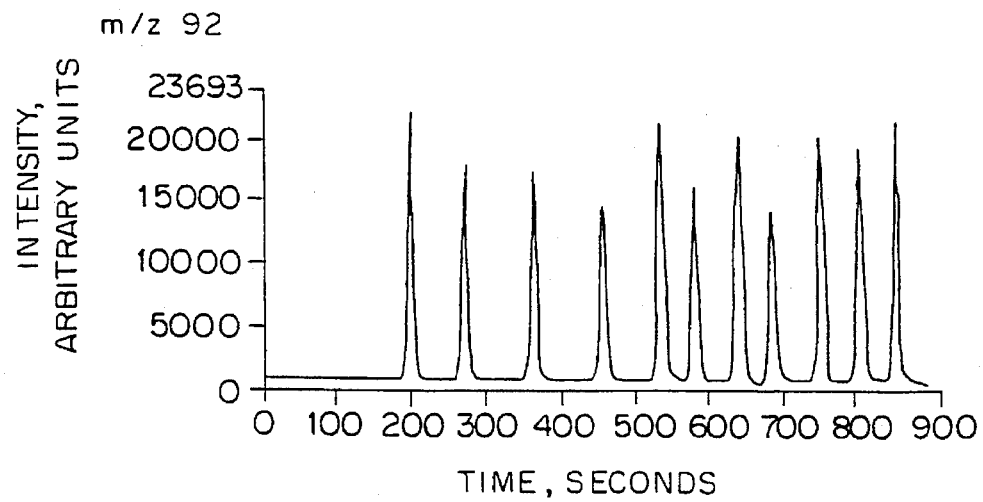

3) Steam was introduced at the desired flow rate and stabilization was reached as monitored by a steady signal on MBMS;

4) Steady state or batch pyrolysis of wood or RDF was performed at this point at a constant steam-to-biomass ratio (S/B) and at three different weight hourly space velocities (WHSV). Sample size was varied to achieve various WHSVs. A typical run of consecutive wood batches at about 1-minute intervals is shown in FIG. 8 for two of the products;

5) S/B ratio was varied by varying the steam flow rate and step 4) was repeated;

6) Catalyst was regenerated with dilute oxygen (5% in helium) at 550° C. CO and $CO_2$ were monitored on the MBMS to allow the measurement of coke deposited on the partially deactivated catalyst; and 7) Calibration was repeated at the end of the experiments to correct for any changes in the response behavior of the MBMS.

WHSV was estimated by approximating the biomass pulse with a square pulse function of equal area on elapsed time. All the measurements at various WHSVs and S/B's were taken before significant catalyst deactivation due to any coking that occurred. The gaseous residence time through the catalyst bed (inner flow) was kept constant in all experiments by adjusting the flow rate of carrier helium to make up for changes in the steam flow. The value for the volumetric flow rate of steam was obtained from the steam tables of G. J. Von Wylen et al., *Fundamentals of Classical Thermodynamics*. New York: John Wiley and Sons, 1965, where at T=550° C. and P=7 in. of $H_2O$ above atmospheric pressure. These represent the conditions of the reactor gas before entering the catalyst bed.

Figure 9A:
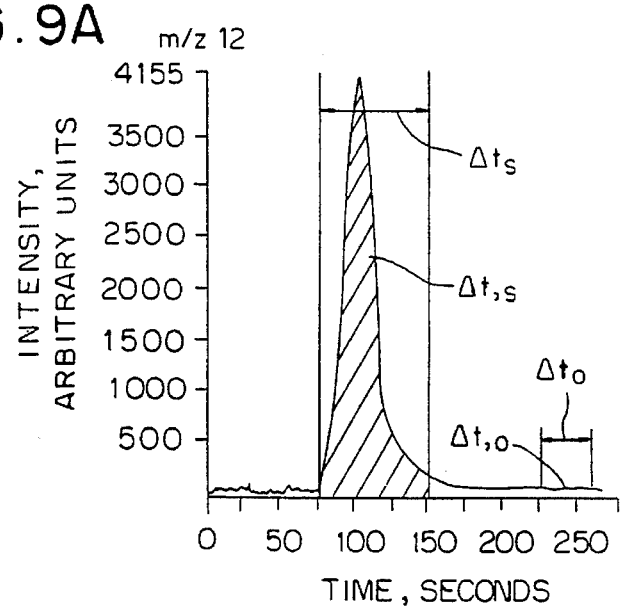
FIG. 9 shows time-resolved ion profiles used for peak areas and background corrections, where (a) M/Z is 42 or propylene, and (b) M/Z is 40 or argon.
Figure 9B:
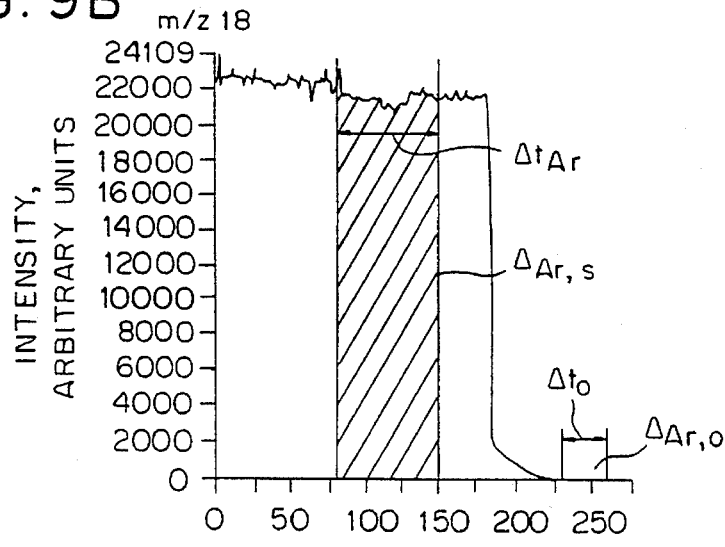

The mass of any product species, $m_i$, was calculated assuming that the net intensity obtained on the MBMS, when normalized to argon, is directly proportional to the concentration of that species in the products. In other words, the mass, $m_i$, is proportional to the net area for species i, i.e.

$$m_i = k_i \frac{r_i^{net}}{r_{Ar}^{net}} \cdot \Delta t_s = k_i \cdot \frac{\frac{A_{i,s}}{\Delta t_s} - \frac{A_{i,0}}{\Delta t_0}}{\frac{A_{Ar,s}}{\Delta t_{Ar}} - \frac{A_{Ar,0}}{\Delta t_0}} \cdot \Delta t_s \quad (2)$$

where $A_{i,s}$ is the MBMS peak area for species i when the sample is present; $A_{i,0}$ is the same area when there is no sample or argon present, i.e. the background area for species i; t's are the peak widths at the baseline; and $k_i$ is the response factor for species i, which is determined by calibration. A graphic description of the above equation is given in FIG. 9.

Figure 10:
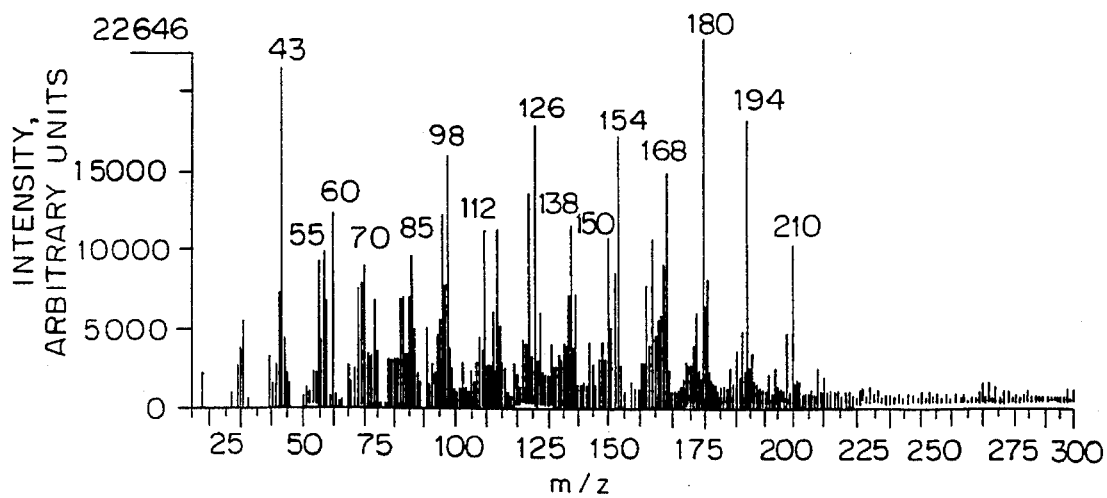
FIG. 10 shows the mass spectrum of hardwood pyrolysis products at 550° C. and residence time of 100 ms.

With respect to spectral characteristics of biomass pyrolysis and cracking, it is clear that the pyrolysis of biomass results in the depolymerization of the major components of biomass (lignin, cellulose, and hemicellulose) through free radical or heterolytic depolymerization. A typical mass spectrum of the straight pyrolysis products of the hardwood used is shown in FIG. 10.

The pyrolysis products of the carbohydrate components of wood can be classified in three main groups: (a) anhydrosugars (m/z 162 and 144) and their dehydration products (m/z 144 and 126); (2) low-molecular-weight oxygenates, such as hydroxyacetaldehyde (m/z 60 and 31) and other acetyl compounds (m/z 43); and (3) cyclic compounds, such as furfurals (m/z 126, 110, and 96), pyrans (m/z 126), lactones (m/z 114 and 98), and hydroxybenzenes (m/z 110 and 126). Lignin pyrolysis is responsible for a series of higher molecular weight species such as monomethoxyphenols (m/z 180, 164,152,150, 138, and 124) and dimethoxyphenols (m/z 210, 194, 180, 168, and 154). These pyrolysis products are reactive and condensible species with a typical pH of 2–3. While direct MBMS analysis of the vapors, as shown in FIG. 10, indicate only minor products with a molecular weight greater than 200, size exclusion chromatography shows a significant fraction of the condensed oil to sluts in the apparent molecular weight range of 200 to 1000 based on polystyrene calibration.

Figure 11:
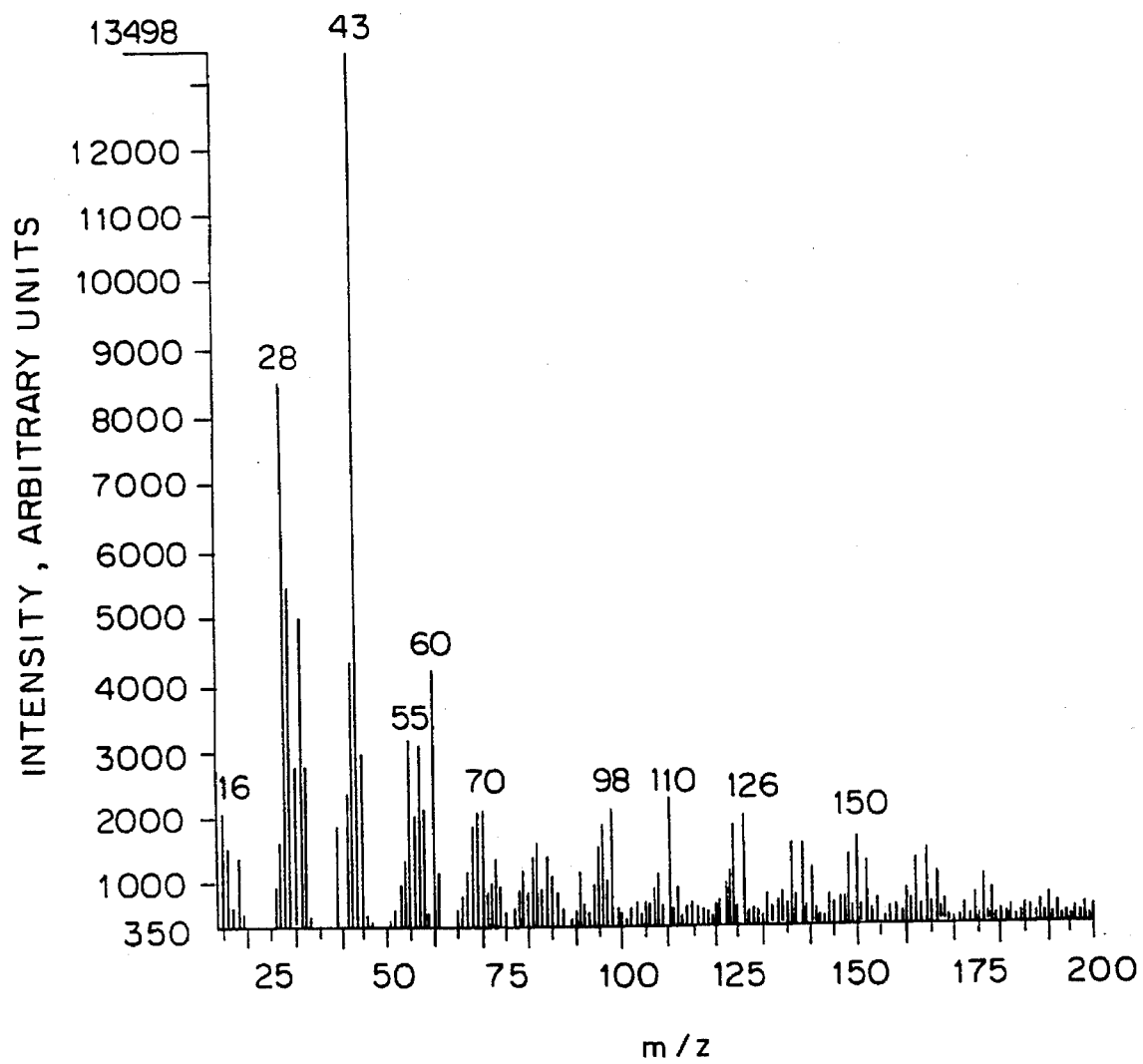
FIG. 11 shows the mass spectrum of thermal cracking products of hardwood pyrolysis at 550° C. and residence time of 1 s.

The effect of moderate thermal cracking on the product spectrum is shown in FIG. 11, where it can be observed that some secondary cracking peaks grow at the expense of primaries. At the temperature and vapor phase residence time of the catalytic conversion step, it appears that a thermal cracking effect occurs analogous to the one shown in FIG. 11. Given the molecular shape selectivity of the zeolites, this thermal cracking is advantageous as higher-molecular-weight methoxy phenols are converted to phenolics such as m/z 110, 124, and 136. The carbohydrate derived peaks are also converted to lower-molecular-weight products with an increase in m/z 28 intensity due to CO. The effect of vapor phase residence time on subsequent catalytic upgrading of pyrolysis oils has been studied by J. Renaud et al., "Low-Pressure Upgrading of Vacuum-Pyrolysis Oils from Wood" in *Pyrolysis Oils from Biomass*, ACS Symposium Series 376, 290–310, ed. E. J. Soltes and T. A. Milne, Washington: ACS, 1988, who found that vapor phase acid-catalyzed reactions lead to increased yields and minimized coke formation. The acids present in the vapor phase appear to be catalyzing the thermal cracking of the primary products to lower molecular weight species.

Figure 12:
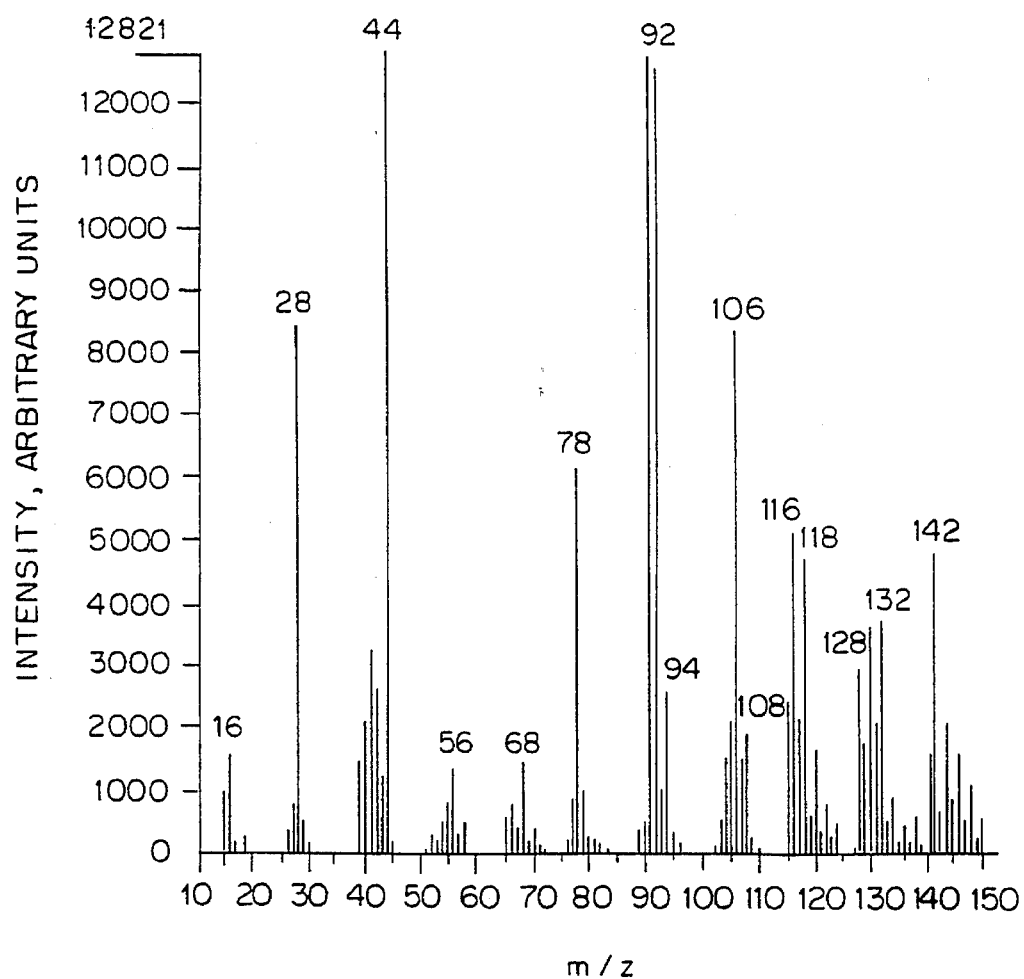
FIG. 12 shows the mass spectrum of catalytic upgrading products of hardwood pyrolysis at 550° C. for catalysts Z-2, where WHSV=7, and S/B=0.6.

A spectrum of the catalytic conversion products from wood pyrolysis vapors is shown in FIG. 12. The formation of olefinic hydrocarbons can be seen here in contrast with straight pyrolysis or moderate thermal cracking with pentene at m/z 70, butene at m/z 56, propene at m/z 42, and ethylene contributing to part of the signal at m/z 28. The major aromatics are present at m/z 78 (benzene), 92 (toluene), and 106 (xylenes). Other organic products are furan (m/z 68), phenolics (m/z 94 and 108), indenes (m/z 116 and 130), benzofurans (m/z 118 and 132), naphthalenes (m/z 128 and 142), and naphthols (m/z 144). Oxygen is rejected from wood as $CO_2$ (m/z 44), CO (m/z 28) and water (m/z 18; however, because steam is used as a carrier gas, it is subtracted from the spectrum as part of the background).

Figure 13:
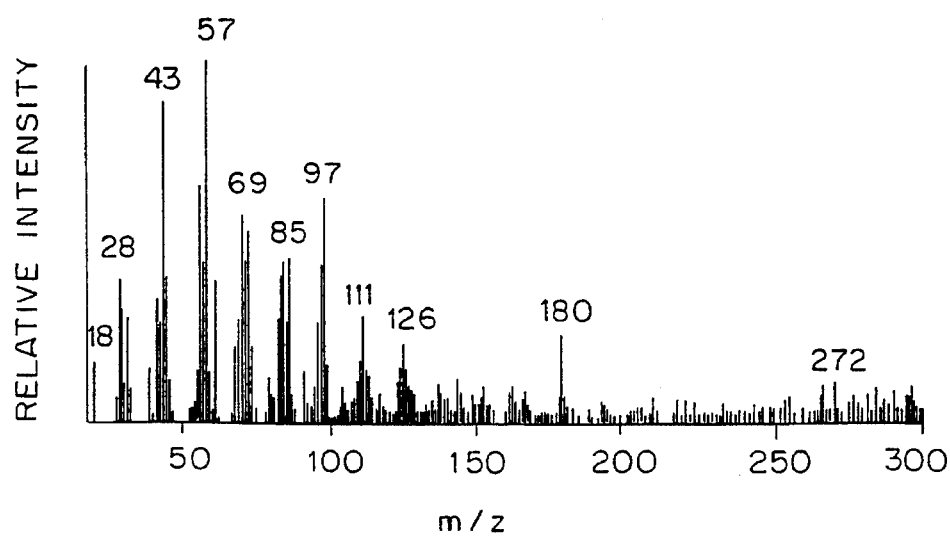
FIG. 13 shows the mass spectrum of RDF pyrolysis products at 550° C. and residence time of 100 ms.
Figure 14:
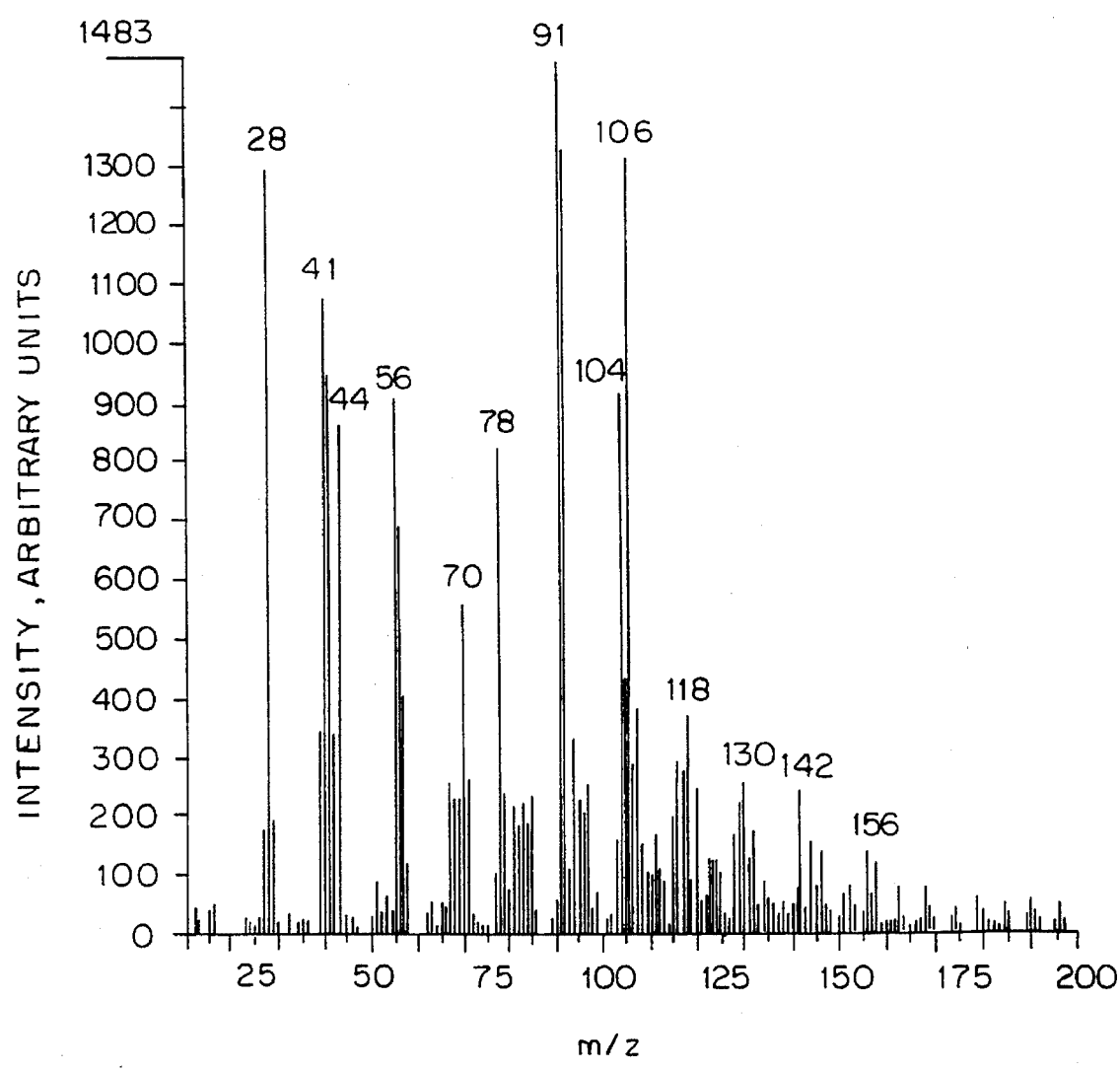
FIG. 14 shows the mass spectrum of catalytic upgrading products of RDF pyrolysis at 550° C., where the catalyst is Z-2, the WHSV=7, and S/B=0.6.

The spectrum for straight pyrolysis of RDF along with the catalytic upgrading spectrum are shown in FIGS. 13 and 14, respectively. It can be observed that the primary pyrolysis of RDF results in lower amounts of lignin-derived products with the major lignin product being monomethoxy phenol. Plastic-derived peaks are hydrocarbon fragment ions from polyethylene (m/z 43, 57, 69, 85, 97, 111, etc.), styrene from polystyrene (m/z 104) and HCl (m/z 36) and benzene (m/z 78) from PVC. The catalytic products show a significant increase in olefins compared with those of wood (FIG. 12).

With respect to the catalytic activity of zeolites, the first class of catalysts examined represent various compositions of ZSM-5s that differ in aluminum concentrations only. Because the acidity of these catalysts results from their tetrahedral aluminum sites, different acidities are expected at different aluminum concentrations. The acidities were measured using temperature programmed desporption (TPD) of ammonia. The variation of acidity with the $Al_2O_3/SiO_2$ ratio was found to be linear and similar to that reported by D. H. Olson et al., "Chemical and Physical Properties of the ZSM-5 Substitutional Series" J. Catal. 61, 390–396 (1980).

A standard measure of cracking activity of acid catalysts is expressed in terms of $\alpha$-activity. This is defined as the ratio of rate constants for the first order cracking of n-hexane at 538° C. and 100 torr with respect to that of an amorphous silica-alumina containing 10% alumina. The variation of $\alpha$-activity of the catalysts under study with their aluminum content was found to be in agreement with the results of W. O. Haag et al., "The Active Site of Acidic Aluminosilicate Catalysts" Nature 309, 589-591 (1984), who reported a constant turnover number of 2.8 moles/min/site for the cracking of n-hexane on ZSM-5.

The activity of these catalysts in the conversion of pyrolysis vapors is expressed as product yields. A representative example of product yields from biomass as measured by the MBMS is given in Table 3.

TABLE 3

| Product | Run 1 | Run 2 | Run 3 |
|---|---|---|---|
| $H_2O$ | 25.6 | 27.2 | 26.3 |
| CO | 11.5 | 11.6 | 11.4 |
| $CO_2$ | 10.7 | 11.4 | 10.9 |
| $CH_4$ | 2.9 | 2.9 | 3.1 |
| $C_2H_4$ | 5.5 | 5.5 | 5.7 |
| $C_3H_6$ | 3.1 | 3.3 | 3.0 |
| $C_4H_8$ | 1.5 | 1.5 | 1.3 |
| $C_4H_{10}$ | 2.2 | 2.0 | 2.0 |
| $C_5H_{10}$ | 1.1 | 1.3 | 1.0 |
| Benzene | 0.5 | 0.3 | 0.4 |
| Toluene | 2.2 | 1.8 | 1.9 |
| Xylene | 1.7 | 1.3 | 1.8 |
| Coke | 5.0 | 5.0 | 5.0 |
| Char | 15.7 | 16.5 | 16.4 |
| Total | 89.2 | 91.6 | 90.2 |

The yield of $H_2O$ was determined from the residual oxygen. The amount of coke was assumed to be 5.0% from the previous studies of Milne et al. ; however, the amount of char and ash was determined gravimetrically at the end of each run. As illustrated in Table 3, the olefins accounted for were in the $C_2$–$C_5$ range, while the aromatics include benzene, toluene, and xylene (BTX). The discrepancy in the overall mass balance appears to have resulted from the product species not accounted for, such as higher molecular weight hydrocarbons, naphthalenes, and furans.

Figure 15:
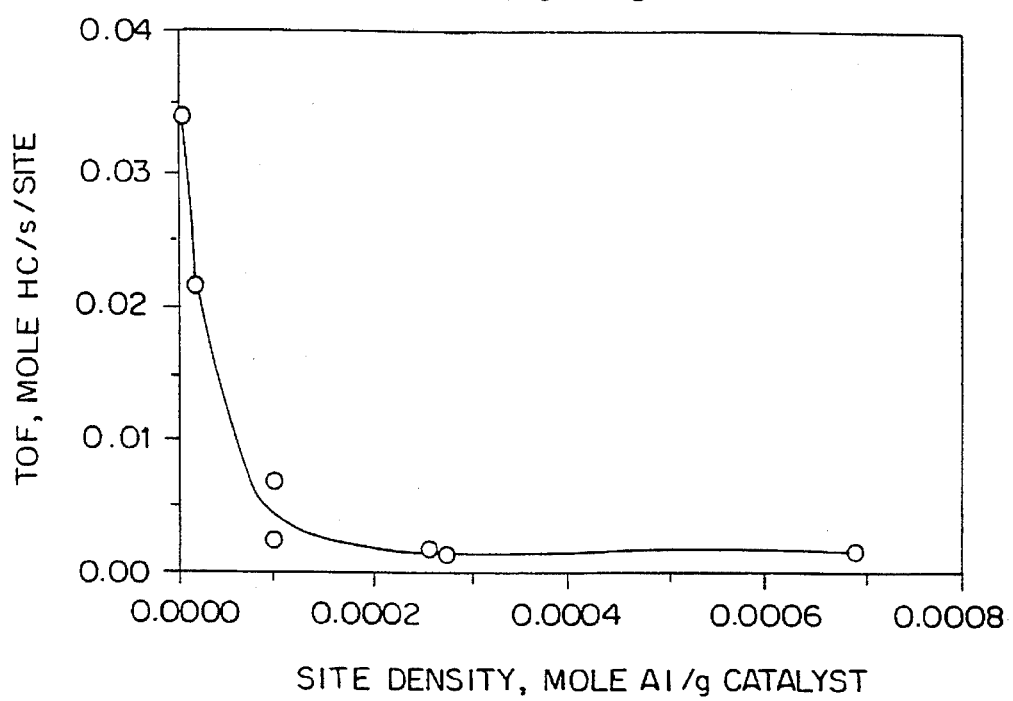
FIG. 15 shows the turnover frequency for the production of hydrocarbons at 550° C. from biomass on pure ZSM-5 with various aluminum site densities.

In order to address the intrinsic activity of straight ZSM-5 catalysts, the turnover frequency (TOF) is defined as:

$$TOF = \frac{\text{moles } HC \text{ produced}}{\text{site} \cdot \text{sec}} = \frac{(\text{Yield of } HC)}{MW_{HC}} \cdot \frac{WHSV(x+1)}{1800 \, MW_Z} \quad (3)$$

where $MW_{HC}$ is the weight averaged molecular weight of hydrocarbon products (olefins and aromatics), $MW_z$ is the molecular weight of the unit cell of the zeolite (a constant), and $x=SiO_2/Al_2O_3$. When the TOF is calculated from equation (3) and plotted against the Al site density, FIG. 15 is obtained. Although the initial activity of 0.035 mole/s/site (or 2.1 mole/min/site) is in agreement with the TOF obtained for n-hexane conversion, the sharply declining behavior of the curve indicates inaccessibility of the acid sites caused by mass transfer limitations or by the increased acidity of the more dilute aluminum sites in the zeolite matrix.

The yields of olefins and aromatics from RDF were determined for all catalysts under nine different conditions (three WHSVs and three S/Bs). The effect of temperature in the 450°–550° C. range was not found to be significant. This is in contrast to previous results of Milne et al. using the Mobil ZSM-5 catalyst. Because the Mobil ZSM-5 contains an unspecified binder, the temperature effect may be due to the presence of binder.

Figure 16:
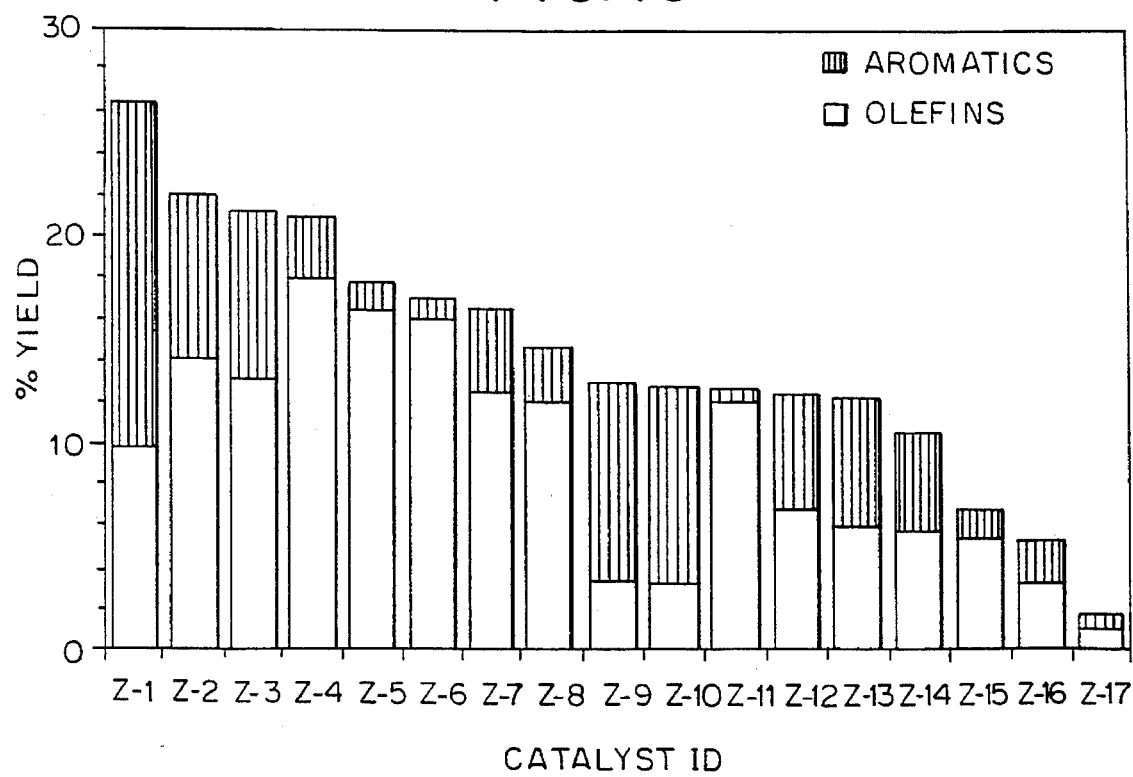
FIG. 16 shows the comparison of the maximum yields of olefins and aromatics from RDF for various catalyst identification (ID)

The maximum yields of hydrocarbons ($C_2$–$C_5$ olefins and BTX) from RDF under optimal conditions of WHSV and S/B for each catalyst are shown in FIG. 16. Each value reported is an average determined from three replicate experiments with an experimental error of ±5%. From FIG. 16, four catalysts (Z-1, Z-2, Z-3, and Z-4) with the highest total yield of hydrocarbons are identified. The energy conversion efficiency, for the highest yield catalyst (Z-1), was calculated to be 73.7%, when $C_2^+$ hydrocarbons produced from RDF are taken into account This is based on the higher heats of combustion of the products and the RDF feedstock.

Table 3 shows the yields of the products from catalytic upgrading of biomass pyrolysis vapors, for catalyst Z-7, at T=550° C., WHSV=7, S/B=0.6, for the weight percent of wood fed.

Figure 17A:
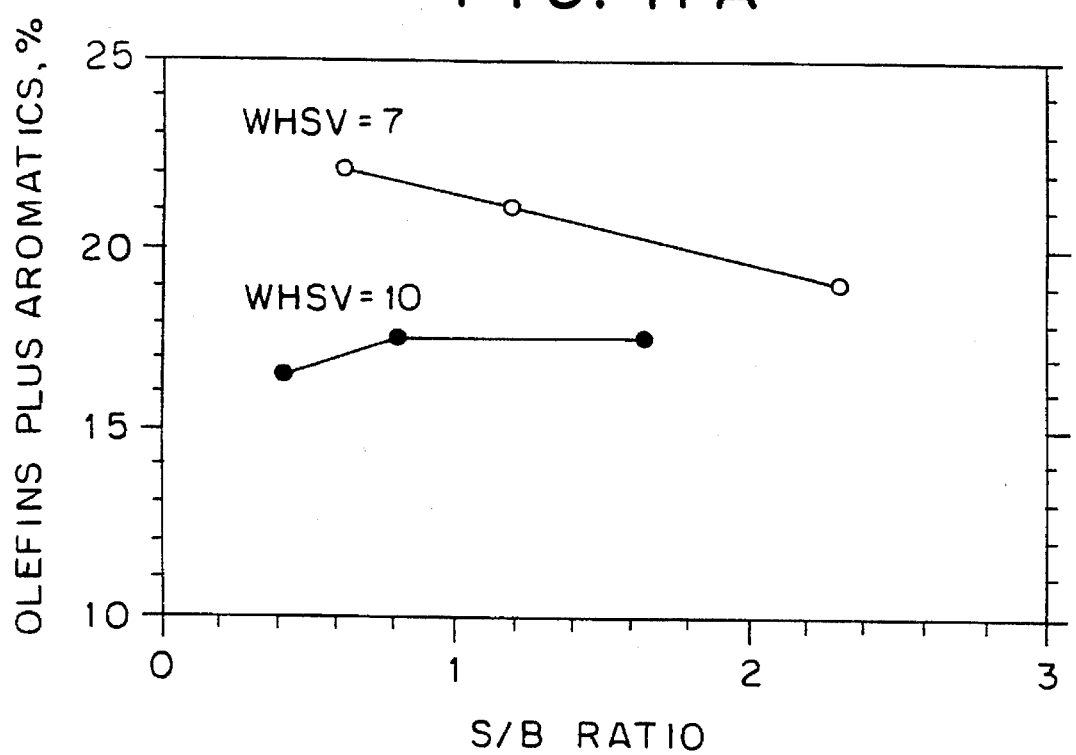
FIG. 17 shows the affect of WHSV and S/B on the yields from RDF for catalyst Z-2, where the temperature is 525° C.
Figure 17B:
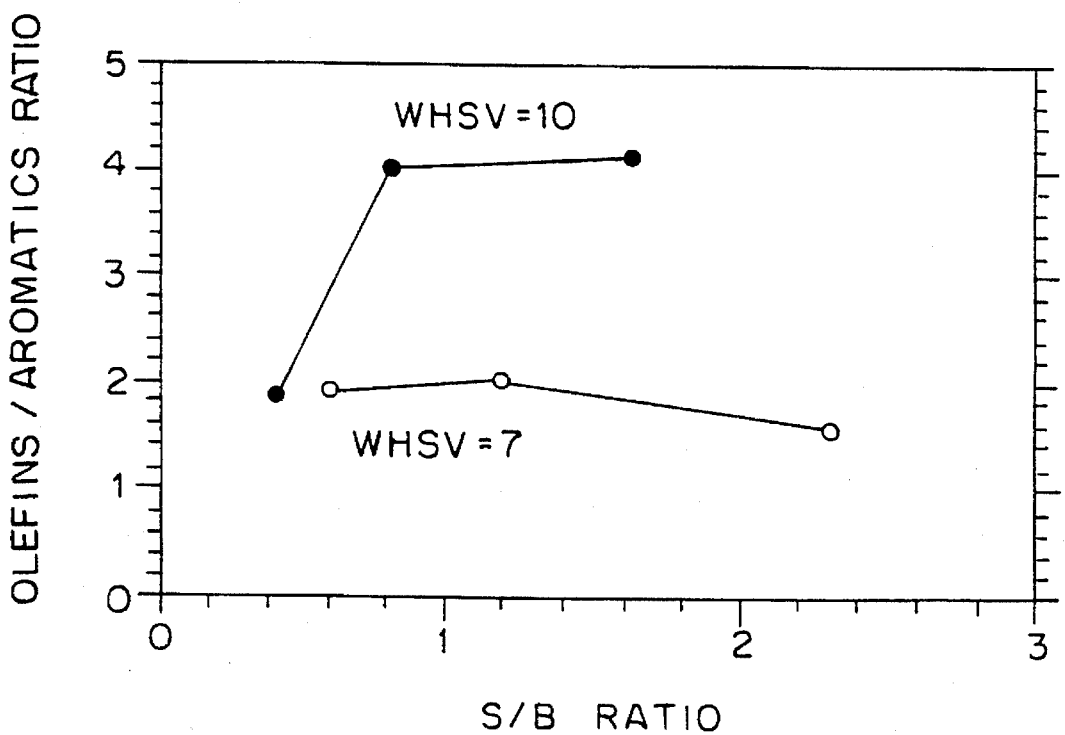
Figure 18A:
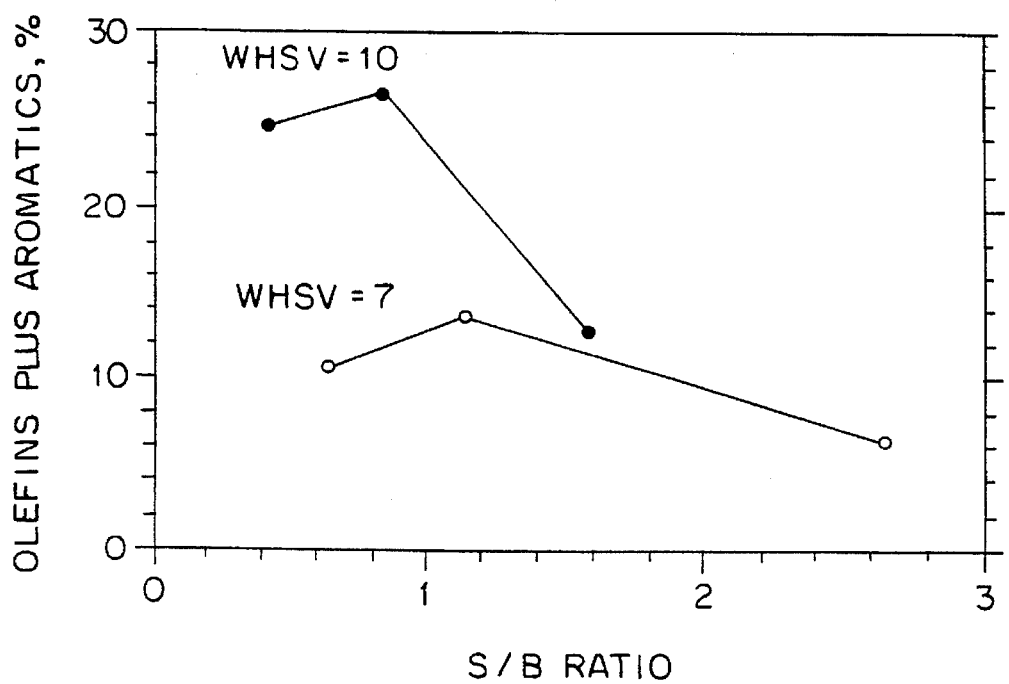
FIG. 18 shows the affect of WHSV and S/B on the yields from RDF for catalyst Z-1, at 525° C.
Figure 18B:
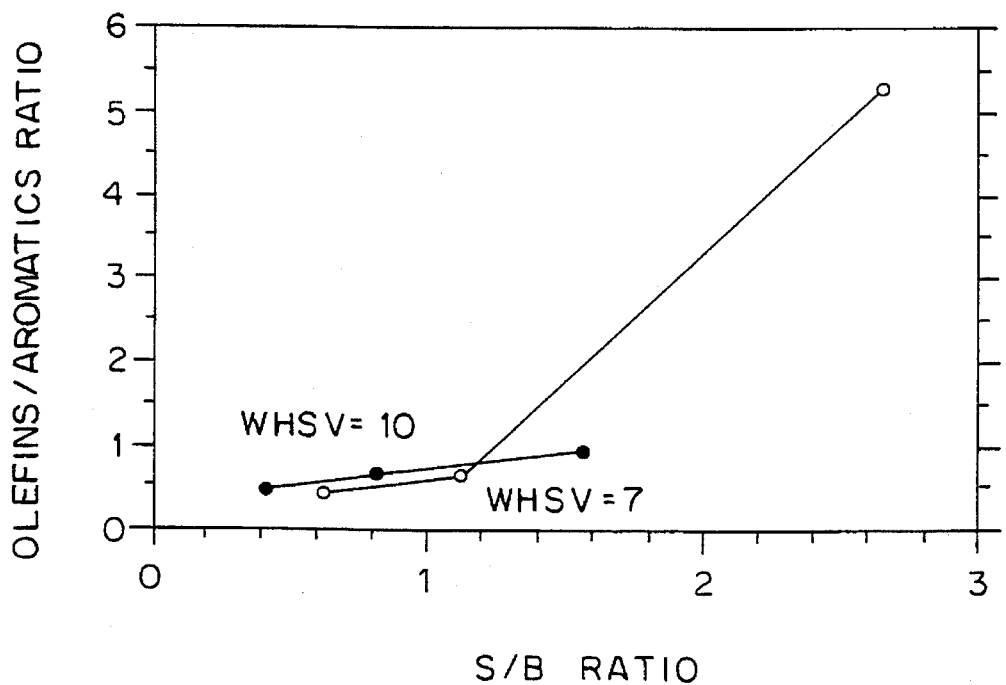
Figure 19A:
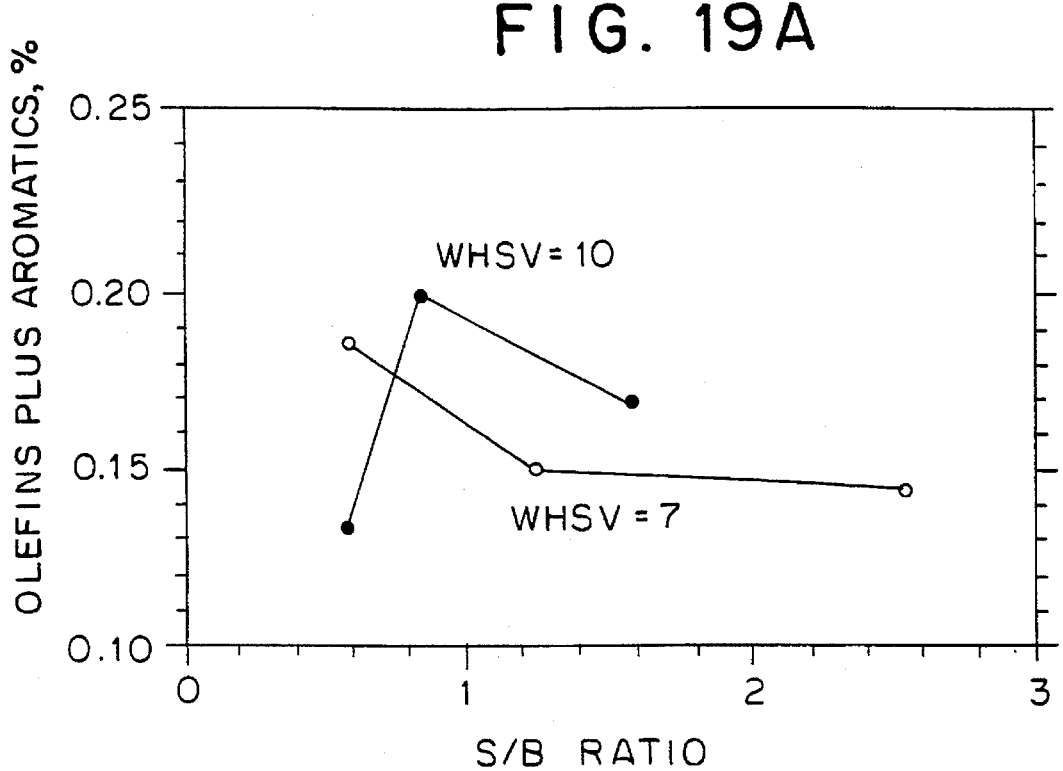
FIG. 19 shows the affect of WHSV and S/B on the yields from RDF for catalyst Z-4 at 525° C.
Figure 19B:
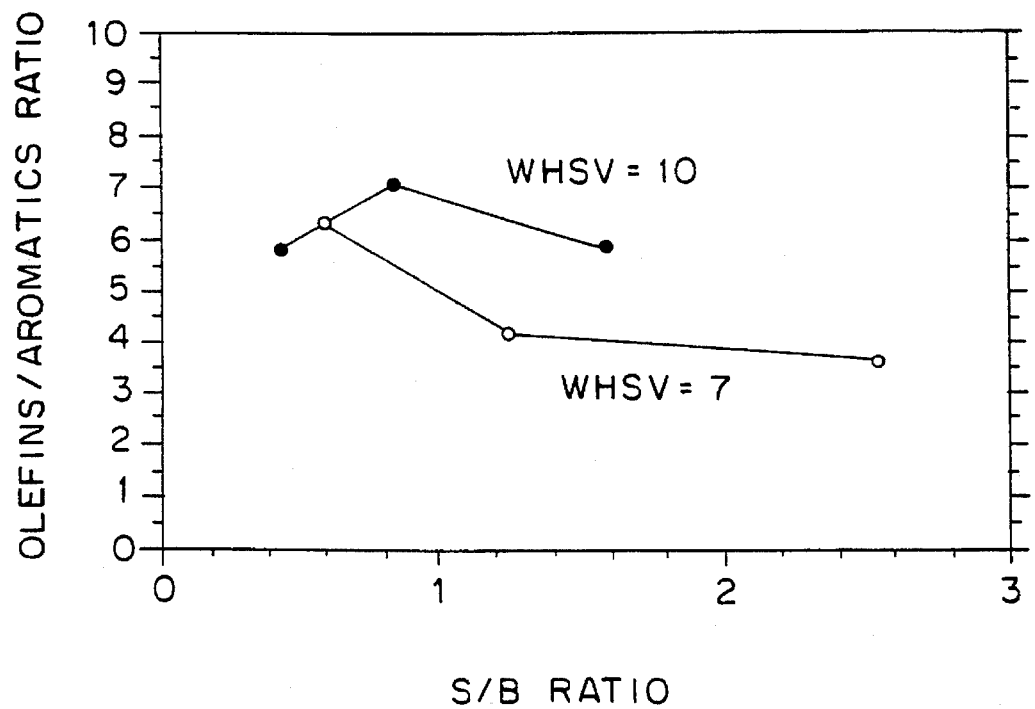
Figure 20A:
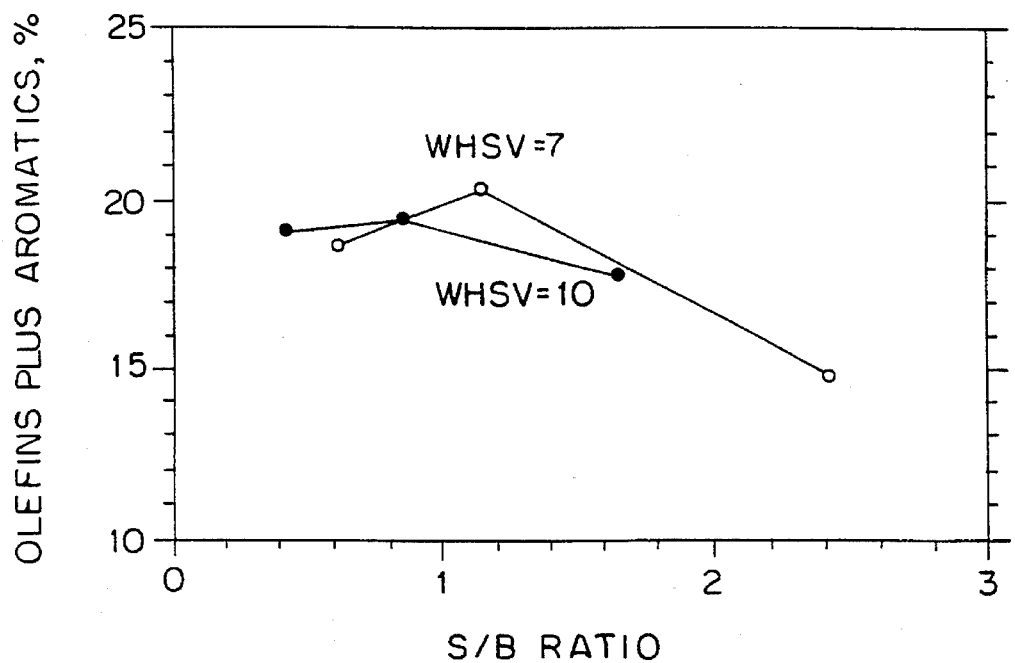
FIG. 20 shows the affect of WHSV and S/B on the yields from RDF for catalyst Z-3 at 525° C.
Figure 20B:
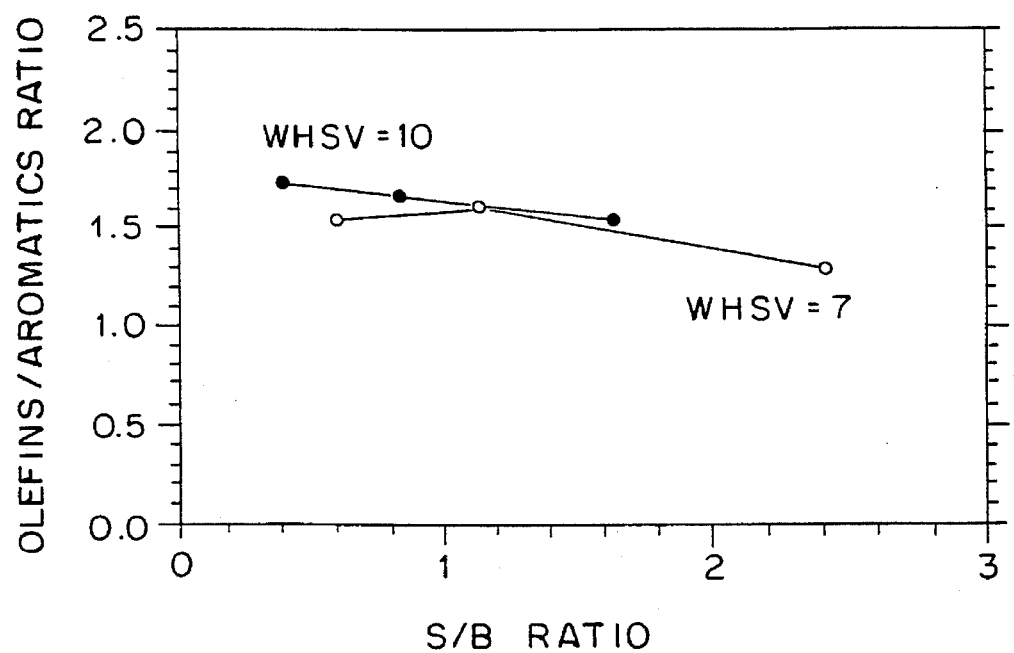

Graphs of the WHSV and S/B for promising catalysts are shown in FIGS. 17 through 19. The trend with WHSV appears to indicate that higher olefins-to-aromatics ratio or selectivity toward olefins at higher WHSVs. This trend shows the formation of olefins preceding the formation of aromatics.

Two of the catalysts tested (Z-5 and Z-11) showed extremely high selectivities towards olefins. These are SAPO-11 and SAPO-5 molecular sieves, with 10-membered and 12-membered rings, respectively. This structure (namely the non-intersecting pores) is necessary for the high selectivity feature toward olefins. The SAPO-5 catalyst, because of larger pores, converts more larger molecules than does ZSM-5.

Some of these catalysts show more sensitivity to the effect of operating conditions than others. For example, catalyst Z-1, despite its very high maximum yield, is more sensitive to the operating conditions than catalyst Z-2 (see FIGS. 17 and 18) and may not be a good candidate if its optimal operating conditions are not industrially favored.

From a purely basic perspective or point of view, one can calculate the maximum yield of olefins and aromatic BTX from wood and RDF based on a pure material balance or stoichiometric considerations. Based on the elemental analyses of hardwood and RDF samples, the following stoichiometrics can be written by selecting products and performing elemental balances:

Wood to olefins (yield=23.6%), $$CH_{1.57}O_{0.70} \rightarrow 0.69\ CH_2 + 0.305\ CO_2 + 0.090\ H_2O \qquad (4)$$

Wood to BTX (yield=25.5%)

$$CH_{1.57}O_{0.70} \rightarrow 0.794\ CH_{1.25} + 0.206\ CO_2 + 0.288\ H_2O \qquad (5)$$

RDF to olefins (yield=23.7%), $$CH_{1.71}O_{0.72} \rightarrow 0.712\ CH_2 + 0.288\ CO_2 + 0.144\ H_2O \qquad (6)$$

RDF to BTX (yield=25.6%), $$CH_{1.71}O_{0.72} \rightarrow 0.813\ CH_{1.25} + 0.187\ CO_2 + 0.346\ H_2O \qquad (7)$$

In the yield calculations above, only 60% of biomass was converted to pyrolysis oil, which has the same elemental composition as biomass itself. The aromatics in the above equations have an average empirical formula of $CH_{1.25}$, similar to that of xylene ($C_8H_{10}$).

FIG. 16 indicates that, for catalyst Z-4, about 76% of the stoichiometric limit on yields of olefins from RDF has been achieved. For catalyst Z-1, however, 108% of the limit on the combined yields of olefins and aromatics has been obtained. This appears to indicate that more than 60% of RDF has been converted to pyrolysis oil.

Figure 21:
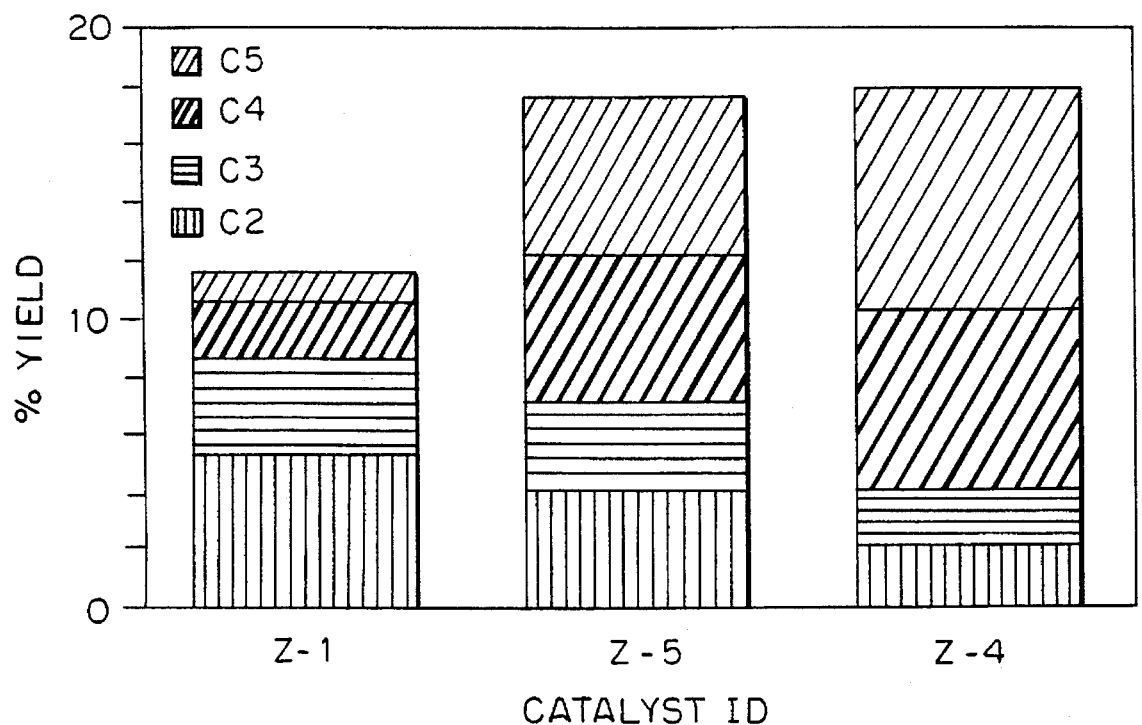
FIG. 21 shows various distributions of olefins from RDF, at 550° C., where the WHSV=10, and the S/B=0.6 for various catalyst identification (ID)
Figure 22:
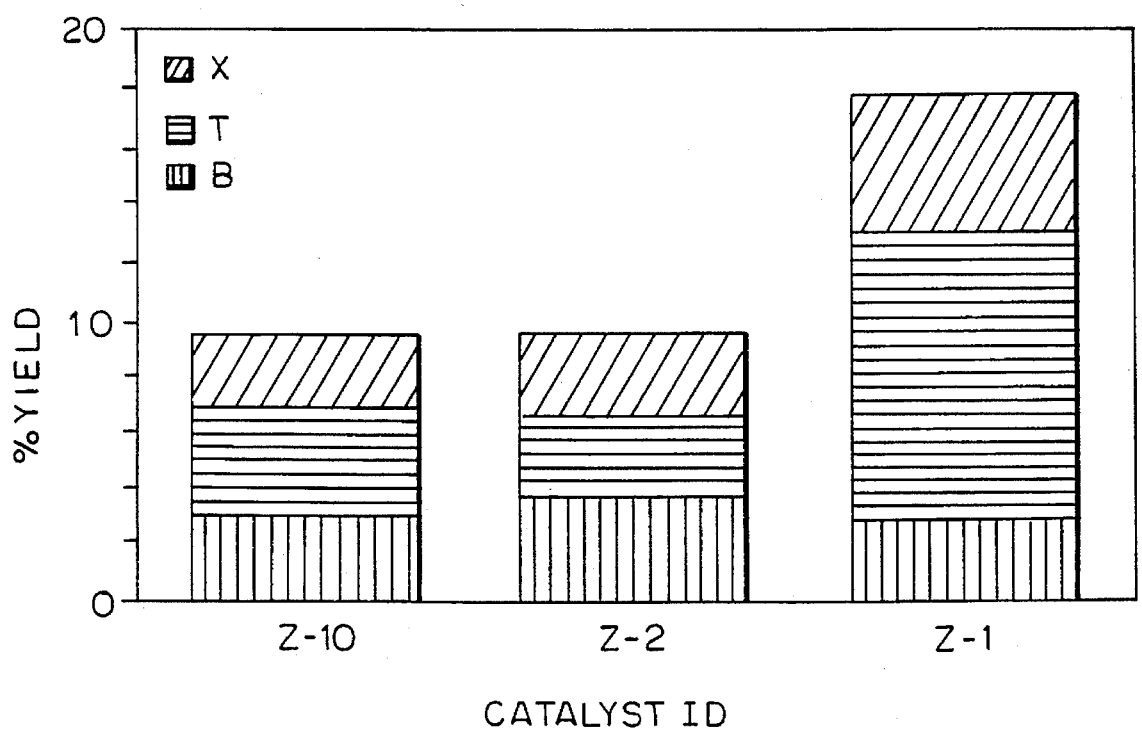
FIG. 22 shows various distributions of aromatics from RDF at a temperature of 550° C., where the WHSV=10, and the S/B=0.6, for various catalyst identification (ID)

As alluded to earlier, the distribution of olefins and aromatics can also be controlled by the catalyst selected. The distribution of $C_2$ to $C_5$ olefins for three selected catalysts can vary widely as shown in FIG. 21. The two extreme cases are represented by catalysts $Z_{-1}$ and $Z_{-4}$ where low and high molecular weight olefins are selected, respectively. In the case of catalyst Z-5 and Z-4, it is expected that C6 olefins are also present. The distribution of aromatics (BTX) for three selected catalysts is similarly shown in FIG. 22.

Figure 23A:
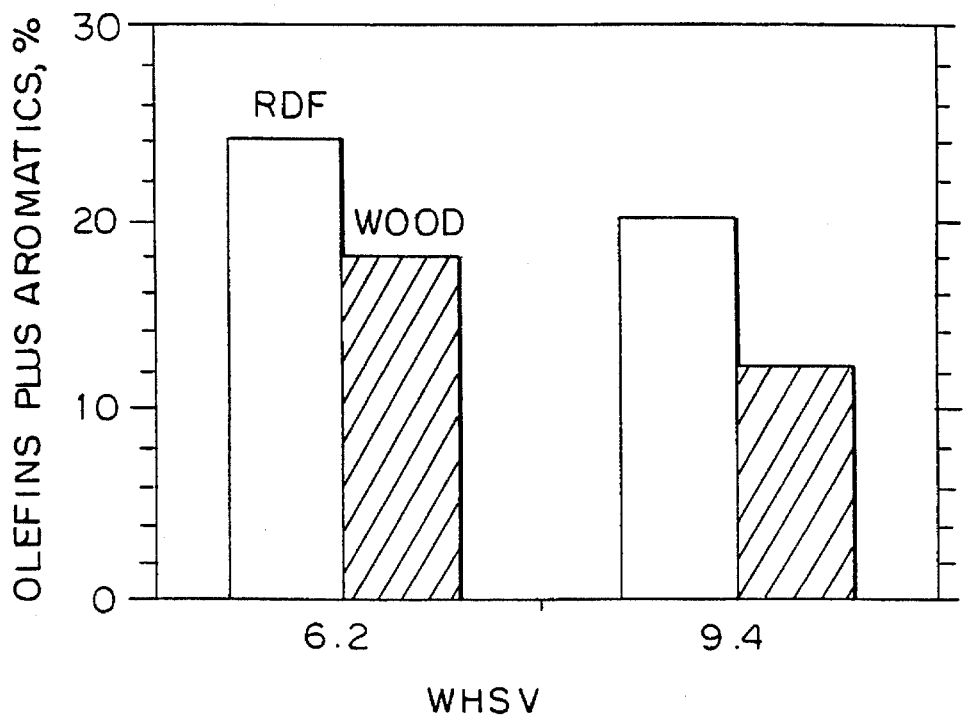
FIG. 23 shows a comparison of yields from hardwood and RDF for Z-2 catalyst at 550° C., and an FIG. 24 shows the build-up of a primary pyrolysis product (M/Z 60) as catalyst (Z-2) deactivates at 550° C., where WHSV=7, S/B=0.6 in grams of feed per gram of catalyst (g feed/g catalyst)
Figure 23B:
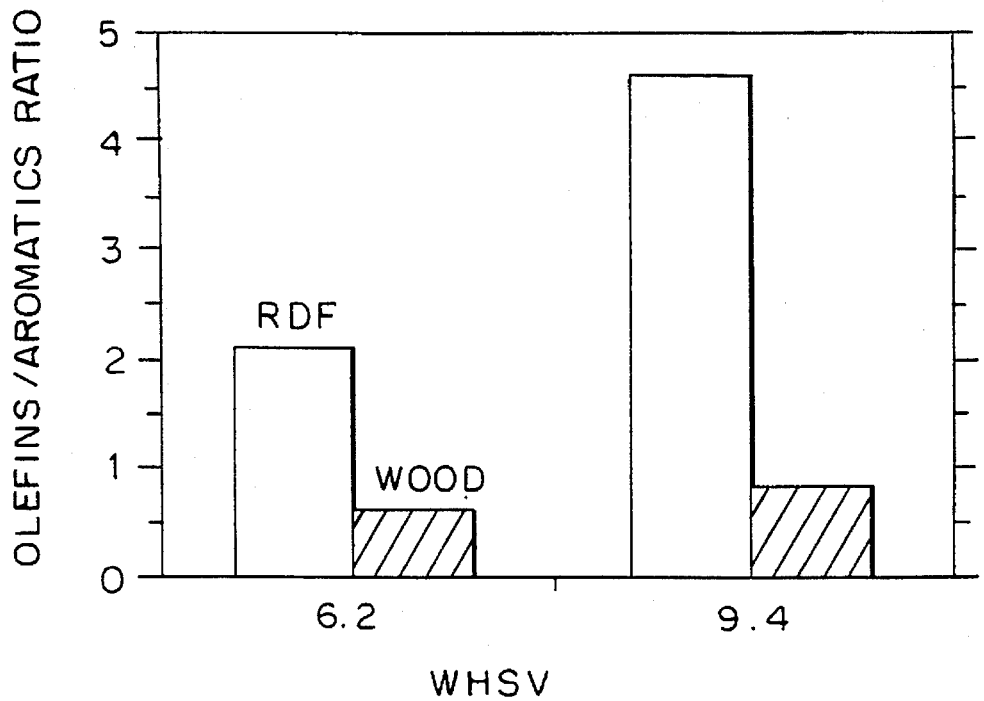

With regard to the effect of the feedstock, it can be seen from the EHI and the stoichiometric yields above, that RDF is a higher yielding feedstock. A series of experiments were conducted under identical conditions of upgrading for hardwood and RDF. A comparison of yields from hardwood and RDF is shown in FIG. 23 for one of the high activity catalysts (Z-2). It is apparent that both the total yield and the yield of olefins are higher for RDF compared with those for hardwood. This is believed to be due to the high plastic content of RDF (5%–10%), some of which depolymerizes to hydrocarbons of higher EHI. However, the increase in yield when using RDF rather than wood is much higher than what is expected based on stoichiometric differences (equations 4–7). This appears to be due to the lower amount of lignin-derived products from RDF, which are known to be less readily converted to olefins and aromatics than carbohydrate-derived pyrolysis products.

The advantages of RDF over wood are summarized as follows:

1) The environmental problem of MSW (municipal solid wastes) disposal is mitigated;
2) Higher yields of olefins are obtained, and the olefins may be further converted to fuel-grade alcohols or other oxygenates;
3) A considerable amount of styrene is produced (1%–2% yield) that can be economically recovered; and
4) Slower coking of the catalyst is expected because of the higher hydrogen content of RDF; however, the effect of Cl, S, and volatilized metals needs to be dealt with.

Figure 24:
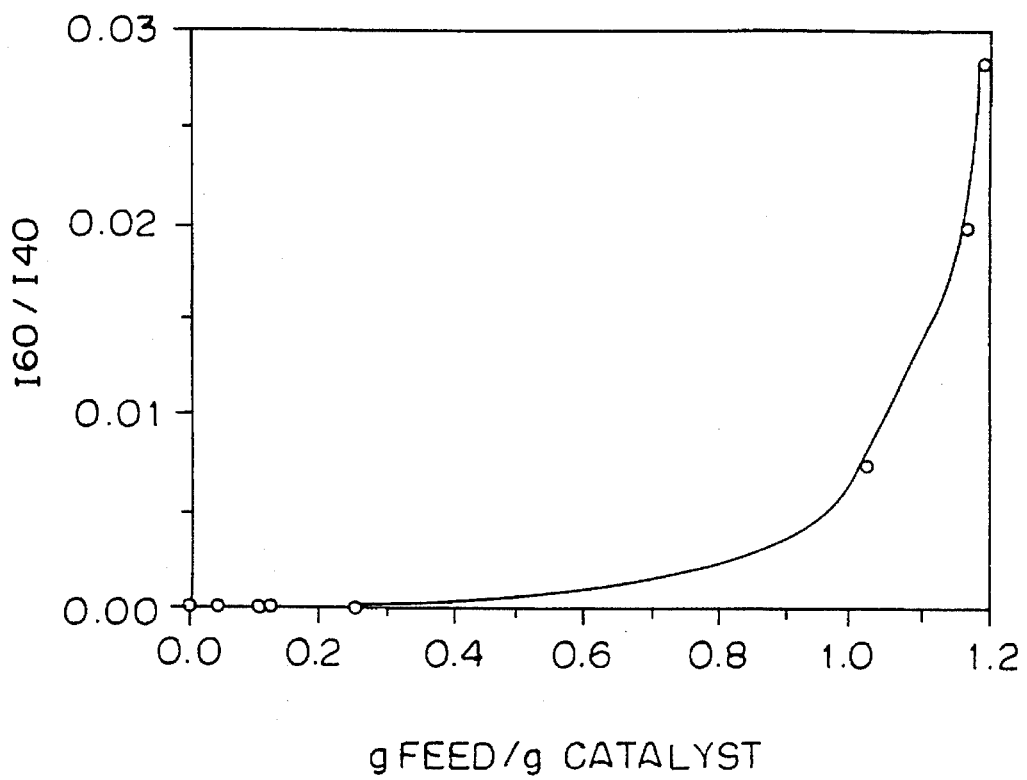

Catalyst longevity studies were arrived at while conducting the process of the invention by performing tests in a fixed-bed MBMS screening reactor for one of the new catalysts (Z-2). Repeated pulses of wood were pyrolyzed at constant WHSV and S/B until the catalyst began to deactivate. This deactivation was monitored by a gradual emergence of some primary pyrolysis species (m/z 60 and 150) and intermediate catalytic products (m/z 94 and 108). It was found that the intensity of all of these masses increased with catalyst deactivation. However, the intensity profile for mass 60, a primary pyrolysis product, was taken as the breakthrough of feed and an indication of catalyst deactivation. This profile as a function of gram biomass fed/gram catalyst (or time on stream) is shown in FIG. 24. The intensity is normalized to that of the argon tracer gas. The average value for $I_{60}/I_{40}$ in straight pyrolysis at 550° C., where no catalyst is present, is approximately 1.0. This indicates that the catalyst in FIG. 24 is still far from being deactivated.

Figure 25:
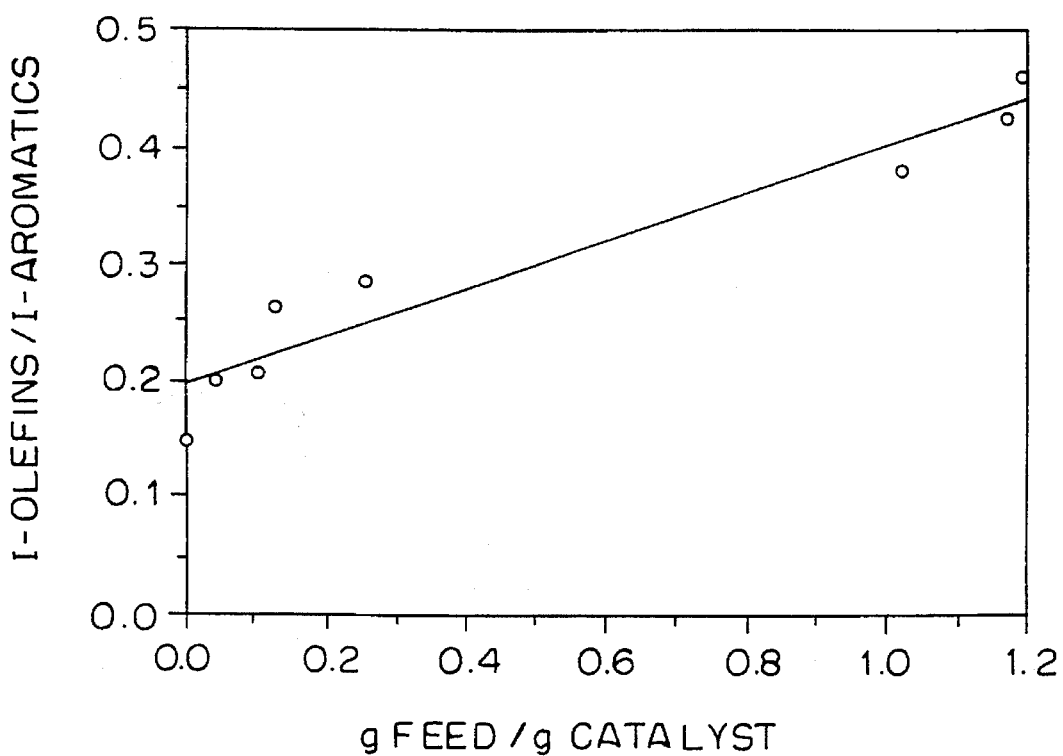
FIG. 25 shows the variation of product distribution as catalyst (Z-2) deactivates at 550° C., where WHSV=7, for S/B=0.6, in grams of feed per gram of catalyst (g feed/g catalyst)
Figure 26:
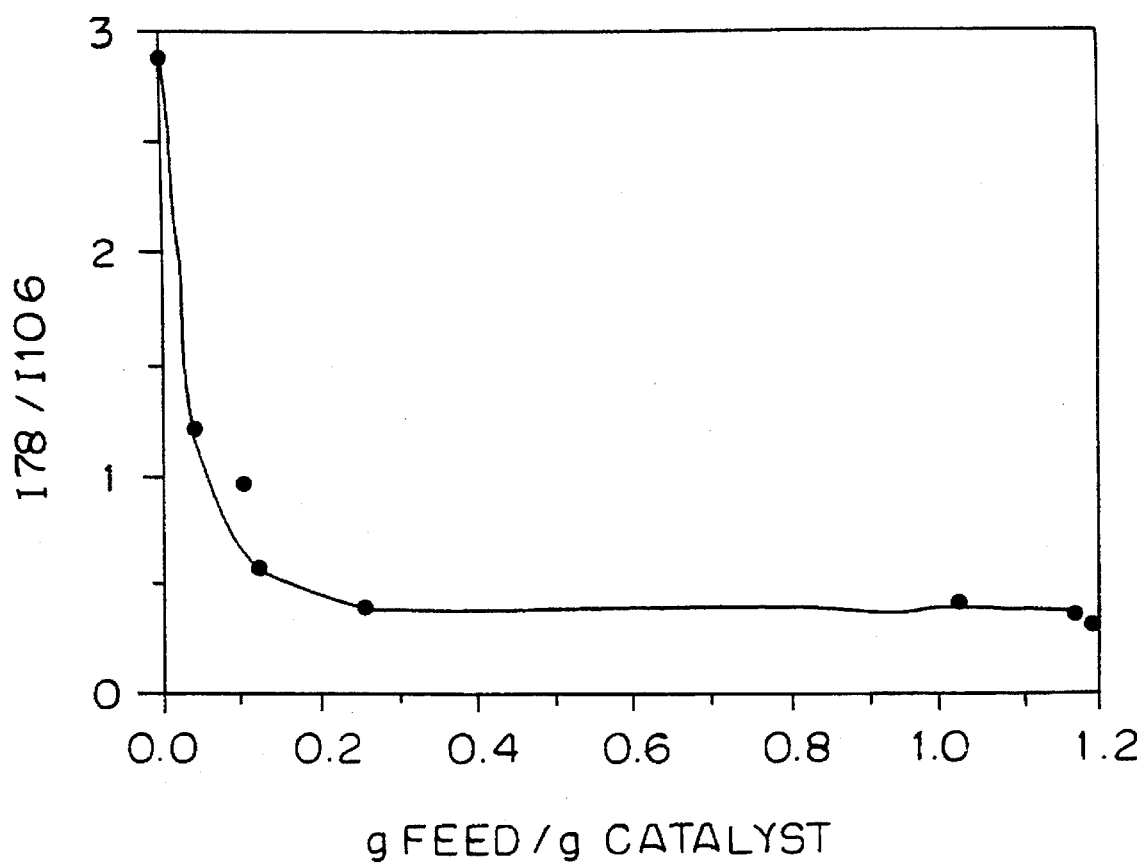
FIG. 26 shows the variation of benzene/xylene ratio as catalyst (Z-2) deactivates at 550° C., where the WHSV=7, and the S/B=0.6, in grams of feed per gram of catalyst (g feed/g catalyst).

The selectivity of products was monitored as the ratio of olefins to aromatics as well as the ratio of benzene to xylene as shown in FIGS. 25 and 26, respectively (for catalyst Z-2). It can be seen that the selectivity toward olefins increases with catalyst deactivation. This observation is consistent with the production of olefins at a higher effective WHSV and indicates that one of the major pathways to aromatics is by oligomerization of olefins, cyclization, and dehydrogenation in a complex series of reactions. The ability to aromatize is best early in the catalyst life and at lower WMSVs. It is also observed that the ratio of benzene to xylene decreases with deactivation and suggests either a similarity of sites in the formation of benzene and coke precursors or a loss of dealkylation ability as the catalyst deactivates.

After deactivation of the catalyst (Z-2) subjected to the pyrolysis of 2.5 g of hardwood per g of catalyst at 550° C., the catalyst was regenerated in dilute (5.0%) oxygen at 550° C. Changes in the intensity of $O_2$, CO, and $CO_2$ were monitored on the MBMS. Based on CO and $CO_2$ produced, the amount of coke on the catalyst was calculated to be about 8.6% by weight. This is equivalent to about 3.5% by weight of wood, which is about half the coke measured in the engineering unit using catalyst (Z-6). The coke gasification reaction appears to take place on the catalyst and appears to be a source of reactive hydrogen and carbon oxides.

EXAMPLE 1

In this example, consecutive samples of a refuse-derived fuel (RDF) were pyrolyzed at 550° C. The pyrolysis vapors were immediately passed over a fixed-bed containing 1.0 g of an [Fe, Al]ZSM-5 catalyst (Z-1) at 525° C. The catalyst had a Si/Fe ratio of 45 and a $SiO_2/Al_2O_3$ ratio of 25, with a crystal size of 8μ. The WHSV of 7.4 $hr^{-1}$ and S/B ratio of 1.1 resulted in a total hydrocarbon yield of 29.3% consisting of 5.2% ethylene, 3.3% propylene, 2.0% butenes, 0.9% pentenes, 2.9% benzene, 10.1% toluene, and 4.9% xylenes. This catalyst produced the highest total yield of hydrocarbons, with a mixed distribution of olefins and aromatics (olefin/aromatic ratio of 0.64), and clearly shows the combination of catalyst structure and operating conditions needed to maximize the yield of hydrocarbons.

EXAMPLE 2

Same conditions as example 1, with the exception that a crystalline [Fe] ZSM-5 catalyst (Z-2) with a Si/Fe ratio of 35 and a crystal size of 2–6μ is used. A WHSV of 6.8 and S/B of 1.2 resulted in a 24.1% yield of hydrocarbons consisting of 3.5% ethylene, 4.1% propylene, 6.0% butenes, 2.7% pentenes, 3.4% benzene, 2.2% toluene, and 2.1% xylenes, and this corresponds to an olefin/aromatic ratio of 2.11.

EXAMPLE 3

Same conditions as in example 1, with the exception that a crystalline [Co] ZSM-5 catalyst with a Si/Al ratio of 70 and a crystal size of 2–3μ is used. A WHSV of 7.4 and S/B of 1.1 resulted in a 20.2% yield of hydrocarbons consisting of 4.5% ethylene, 2.8% propylene, 3.9% butenes, 1.2% pentenes, 1.9% benzene, 2.5% toluene, and 2.2% xylenes, and this corresponds to an olefin/aromatic ratio of 1.57.

EXAMPLE 4

Same conditions as example 1, with the exception that a crystalline [Cu] ZSM-5 catalyst (Z-4) with a $SiO_2/Al_2O_3$ ratio of 75 and a crystal size of 3–5μ is used. A WHSV of 10.1 and S/B of 0.8 resulted in a 20.0% yield of hydrocarbons consisting of 2.1% ethylene, 1.8% propylene, 6.4% butenes, 7.2% pentenes, 0.8% benzene, 0.8% toluene, and 0.9% xylenes, and this corresponds to an olefin/aromatic ratio of 7.01. This example shows one of the highest yields of olefins (17.5%) with a relatively high selectivity, and thus selectivity remained high when WHSV was varied between 6.7–10 and an S/B ranging of 0.4–2.5. Higher molecular weight olefins ($c_6^+$) appear to be present in the products.

EXAMPLE 5

Same conditions as example 1, with the exception that a crystalline SAPO-11 catalyst (Z-5) with a Si/Al/P ratio of 0.13/0.43/0.43 is used. A WHSV of 6.1 and S/B of 1.4 resulted in a 18.8% yield of hydrocarbons consisting of 4.0% ethylene, 3.1% propylene, 5.0% butenes, 5.5% pentenes, 0.7% benzene, 0.4% toluene, and 0.2% xylenes, and this corresponds to an olefin/aromatic ratio of 13.26. This example shows one of the highest yields of olefins (17.6%) with a very high selectivity. This selectivity remained high when WHSV was varied between 6.1 and 10.6 and one S/B ranged from of 0.5–2.5. High molecular weight olefins ($C_6^+$) appear to be present in the products.

EXAMPLE 6

Same conditions as example 1, with the exception that a crystalline SAPO-5 (Z-11) catalyst with a Si/Al/P ratio of 0.2/0.4/0.4 and a crystal size of 10μ is used. A WHSV of 9.8 and an S/B of 0.4 resulted in a 12.7% yield of hydrocarbons consisting of 2.4% ethylene, 1.7% propylene, 3.9% butenes, 3.8% pentenes, 0.3% benzene, 0.3% toluene, and 0.3% xylenes, and this corresponds to an olefin/aromatic ratio of 13.62. This example shows a very high selectivity towards olefins achieved by the structure of the SAPO-5 catalyst. This selectivity remained high when WHSV was varied between 6.5–10.2 and an S/B ranged from 0.4–2.5. Higher molecular weight olefins ($C_6^+$) appear to be present in the products.

EXAMPLE 7

Same conditions as example 1, however a ZSM-5 catalyst (Z-6) from Mobil R&D Corporation (lot MCSG-2) was used. At a WHSV of 6.7 and S/B of 1.2, 17.1 wt. % hydrocarbons were obtained. They consisted of 6.5% ethylene, 4.3% propylene, 2.9% butenes, 2.6% pentenes, 0.2% benzene, 0.6% toluene, and 0.15 xylenes. This corresponds to an olefin/aromatic ratio of 18.

As described above, the most significant application for the process and products of the present invention is its utility for providing reformulated gasoline components for lowering unburned hydrocarbons and carbon monoxide in the exhaust of gasoline burning vehicles and in the reduction of the vapor pressure of gasoline for use in the summer. These reformulated gasoline components will also serve to provide oxygenated fuels in areas that have severe air pollution problems, and this is of high utility with respect to satisfying the mandated requirements of the CLEAN AIR ACT OF 1990.

While the foregoing description and illustration of the present invention has been particularly shown in detail with reference to preferred embodiments and modifications thereof, it should be understood by those skilled in the art that the foregoing and other modifications are exemplary only, and that equivalent changes in the processes of the invention may be made without departing from the spirit and scope of the invention.

The embodiments of the invention in which an exclusive property or privilege is claimed are as follows:

What is claimed is:

1. A process for conversion of a feedstock of refuse derived fuel (RDF) containing plastic wastes including polyvinyl chloride to provide reformulated gasoline components comprising materials selected from the group consisting of ethers, alcohols, or mixtures thereof, comprising:

drying said feedstock;

subjecting said dried feedstock to fast pyrolysis using a vortex reactor system having a vertically disposed vortex reactor axis;

catalytically cracking vapors resulting from said pyrolysis using a zeolite catalyst;

condensing aromatic byproduct fraction;

catalytically alkylating benzene present in vapors after condensation;

catalytically oligomerizing ethylene and propylene present in said vapors;

catalytically isomerizing said olefins to iso-olefins; and catalytically reacting said iso-olefins with an alcohol to form ethers or with water to form alcohols.

2. The process of claim 1, wherein said catalyst is a ZSM-5 catalyst.

3. The process of claim 2, wherein said catalyst an Fe-ZSM-5 catalyst or an Al-ZSM-5 catalyst with a Si/Al ratio of 25 and a Si/Fe ratio of 45, a crystal size of 8μ, and process conditions including a WHSV of 1–10, a steam to biomass ratio of 0.5–2.5 and a temperature range of about 450°–550° C. to provide hydrocarbons products.

4. The process of claim 2, wherein the catalyst is an Fe-ZSM-5 catalyst with a Si/Fe ratio of 35 and a crystal size of 2–6μ.

5. The process of claim 2, wherein said catalyst is a crystalline ZSM-5 catalyst with a Si/Al ratio of 70 and a crystal size of 2–3μ.

6. The process of claim 21, wherein said catalyst is a crystalline Cu-ZSM5 catalyst with a Si/Al ratio of 75 and crystal size of 3–5μ.

7. The process of claim 1, wherein said catalytic cracking step is performed with a SAPO-5 or a SAPO-11 catalyst.

8. The process of claim 1, wherein $C_2$–$C_5$ olefinic hydrocarbons which are precursors to oxygenated fuels are obtained using a crystalline SAPO-11 catalyst with a Si/Al/P ratio of about 0.13/0.43/0.43, wherein the WHSV is about 6.1–10.6, the steam to biomass ratio is about 0.5–2.5 and the temperature is about 450°–550° C.

9. The process of claim 1, wherein said catalyst is a crystalline SAPO-5 catalyst with a Si/Al/P ratio of 0.2/0.4/0.4 and a crystal size of 10μ.

10. The process of claim 1, wherein said vortex reactor has a replaceable wearplate disposed near a tangential entrance of said reactor.

11. The process of claim 10, wherein said replacable wearplate is made from materials selected from the group consisting of stainless steel, ceramic coated stainless steel, or ceramic.

12. The process of claim 11, wherein the ceramic is selected from alumina or silicon nitride.

13. The process of claims 1 or 10 or 11 or 12, wherein partially pyrolyzed material is re-entrained and recycled around said vortex reactor.

14. The process of claim 13, wherein said vortex reactor system contains a solids recycle loop having means that do not entrain fresh feed into an ejector, but directly to an injector, in order to provide two separate low pressure streams entering said ejector; said two separate low pressure streams being fresh feedstock and recycled solids.

15. The process of claim 14, wherein entrained tramp metal and other non-frangible material is removed without delay of said conversion process.

16. The process of claim 15, wherein the solids recycle loop is fitted with a valving system that removes entrained tramp metal and other non-frangible solid inerts from said recycle loop.

17. The process of claim 16, wherein the valving system consists of two 2-way valves that close the recycle loop and open a pipe in order to shunt entrained, non-frangible solid inerts from said recycle loop.

18. The process of claim 16, wherein the valving system is a three-way plug or ball valve having a straight-through flow pattern that is rotatable to shunt entrained, non-pyrolyzable materials from the vortex reactor system.

19. The process of claims 15 or 16 or 17 or 18, wherein shunted, entrained solids are passed to a cyclone separator to remove solids from an entraining gas stream with the return of cleaned gases to the recycle loop downstream of said valving system.

20. The process of claim 1, wherein the catalytic cracking step is performed with an unmodified HZSM-5 catalyst or a catalyst containing coke, Zn, Na, Ni, Pt, Pd, Re, Cr, Ga, Fe, Co, and/or Cu to promote production of olefins.

21. The process of claims 1, wherein benzene alkylation and oligomerization are performed by a zeolite catalyst containing unmodified HZSM-5.

22. The process of claim 21, wherein the catalyst contains coke, Zn, Na, Ni, Pt, Pd, Re, Cr, Ga, Fe, Co, and/or Cu.

23. The process of claim 1, wherein benzene alkylation and oligomerization are accomplished by SAPO-5 or SAPO-11 catalysts.

24. The process of claim 1, wherein isomerization and etherification occur in two separate reactors, each of which is operated at optimum conditions for said process.

25. The process of claim 1, wherein isomerization and etherification occur in the same distillation column.

26. The process of claim 1, wherein simultaneous isomerization and hydration occur in a same reactive distillation column to form tertiary alcohols.

27. The process of claim 1, wherein said alcohol is methanol.

28. The process of claim 1, wherein said alcohol is ethanol.

29. The process of claim 1, wherein said alcohol is propanol.

* * * * *